(12) United States Patent
Hada et al.

(10) Patent No.: US 6,370,466 B1
(45) Date of Patent: Apr. 9, 2002

(54) BRAKING FORCE RETAINING UNIT

(75) Inventors: Satoshi Hada; Hirotoshi Inoue; Takahiro Eguchi; Toshiya Kanda; Yoichi Sugimoto, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/549,165

(22) Filed: Apr. 13, 2000

(30) Foreign Application Priority Data

Apr. 28, 1999 (JP) ............................................. 11-120841

(51) Int. Cl.[7] ............................. B60K 41/24; G06F 7/70
(52) U.S. Cl. ............................... 701/70; 701/84; 303/89; 303/141; 192/13 A; 188/110
(58) Field of Search ............................... 701/70, 76, 84; 188/4 B, 4 R, 110; 303/141, 122, 89; 192/13 A

(56) References Cited

U.S. PATENT DOCUMENTS

| 4,572,335 A | * | 2/1986 | Kobelt | 188/72.1 |
| 5,457,363 A | * | 10/1995 | Yoshii et al. | 318/432 |
| 5,935,041 A | * | 8/1999 | Tsukamoto et al. | 477/92 |

FOREIGN PATENT DOCUMENTS

| JP | 07-069102 | 3/1995 | |
| JP | 09202159 | 5/1997 | B60K/41/24 |
| JP | 11-78818 | 3/1999 | |

* cited by examiner

Primary Examiner—William A. Cuchlinski, Jr.
Assistant Examiner—Olga Hernandez
(74) Attorney, Agent, or Firm—Sughrue Mion, PLLC

(57) ABSTRACT

A braking force retaining unit, which retains braking force until driving force for starting a vehicle increases to a certain value such that the braking force continues to act on the vehicle after releasing a brake pedal, wherein said braking force retaining unit having a device for decreasing the braking force in accordance with the increasing driving force.

6 Claims, 14 Drawing Sheets

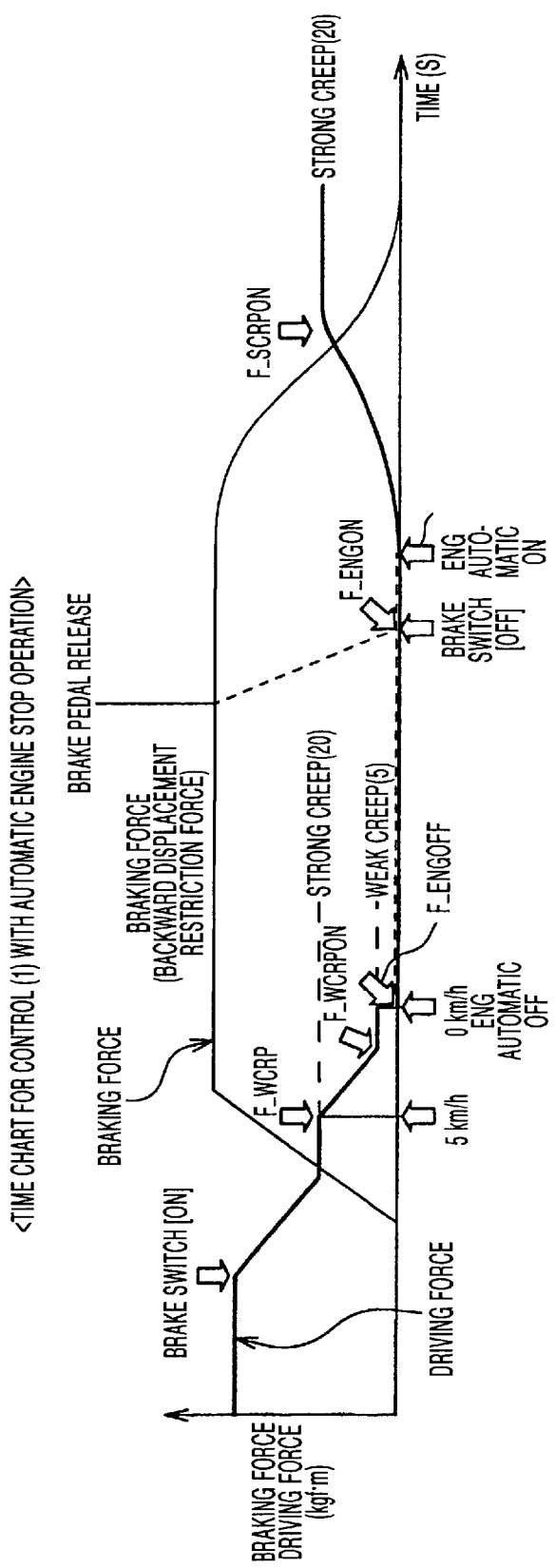

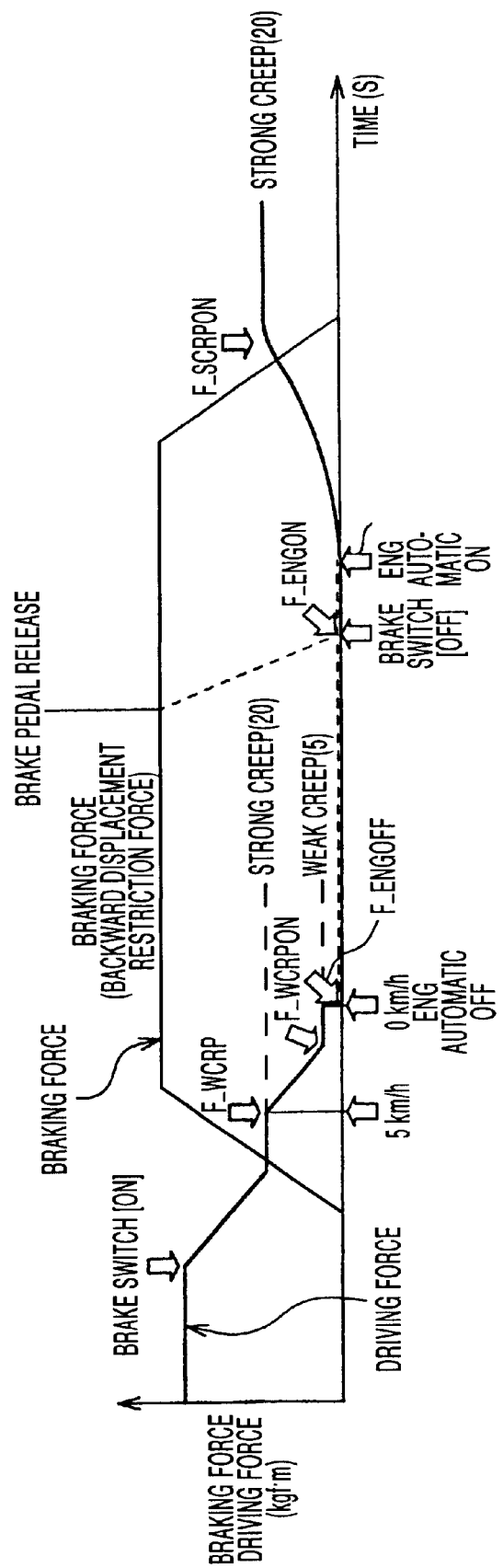

BRAKING FORCE RETAINING UNIT

FIELD OF THE INVENTION

The present invention relates to a braking force retaining unit for continuously retaining braking force after releasing a brake pedal such that the braking force continuously acts on a vehicle until driving force exerted on the vehicle increases to a certain value.

BACKGROUND OF THE INVENTION

Braking force retaining units are known for continuously retaining braking force on a vehicle after releasing a brake pedal such that the braking force continuously acts on the vehicle until driving force is exerted on the vehicle. These braking force retaining units facilitate a smooth starting operation of the vehicle on a slope without unintentional backward displacement of the vehicle.

For example, Japanese Patent Publication No. 9-202159 discloses a braking force control unit utilizing a traction control system. Such a braking force control unit retains a certain level of braking force by the control of the traction control system until driving force detecting means detects strong driving force switched from weak driving force, i.e., driving force for starting the vehicle reaches to a certain value. When the driving force is switched to the strong driving force, braking force to be retained is released, thereby preventing unintentional backward displacement of the vehicle on an up slope.

The applicant also discloses a brake fluid pressure retaining unit utilizing a brake fluid pressure reduction speed control means in Japanese Patent Application No. 10-370249. The brake fluid pressure retaining unit retains braking force until driving force is exerted on the vehicle in such a way that reduction speed of brake fluid pressure within a wheel cylinder is less than to that of brake pedal load applied by a driver and the brake fluid pressure is gradually reduced. When driving force is exerted to start the vehicle, the brake fluid pressure retaining unit releases the brake fluid pressure within the wheel cylinder so as to release the braking force. Therefore, the driver can start the vehicle on an up slope without unintentional backward displacement. on a down slope, the driver can start the vehicle by releasing or partly loosening the brake pedal.

As shown in FIG. 14, the conventional braking force retaining unit instantly releases braking force when driving force reaches to a certain value (for example strong creep condition to be described later in the preferred embodiments). For this reason, the driver experiences a sudden start of the vehicle when the braking force is released. Especially at a down slope, since the vehicle weight affects to the driving force, the driver often experiences a sudden start of the vehicle, which is recognized as an impact or brake dragging upon starting the vehicle.

In view of the above, the present invention seeks to provide a braking force retaining unit, which eliminates the aforementioned sudden impact due to release of the braking force upon starting the vehicle.

SUMMARY OF THE INVENTION

According to the present invention, there is provided a braking force retaining unit, which retains braking force until driving force for starting a vehicle increases to a certain value such that the braking force continues to act on the vehicle after releasing a brake pedal, wherein the braking force retaining unit comprises means for decreasing the braking force in accordance with the increasing driving force.

There is also provided a braking force retaining unit, which retains braking force until driving force for starting a vehicle increases to a certain value such that the braking force continues to act on the vehicle after releasing a brake pedal, wherein said braking force retaining unit decreases the braking force in accordance with the increasing driving force.

In such braking force retaining units, reduction of the braking force is initiated before the driving force reaches to a certain value, and the braking force decreases in accordance with the increasing driving force. Since the braking force is not released instantly upon starting the vehicle, the driver does not experience such a sudden impact.

The term "a certain value" means a driving force value sufficient to retain the vehicle on a slope without depressing the brake pedal. In the preferred embodiments, the driving force value is determined for stationarily retaining the vehicle on a slope at 5 degrees. The driving force value is optional and is determined based on the slope angle for stationarily retaining the vehicle with the brake pedal released. The driving force value may be obtained by measuring driving torque of driving wheels or alternatively by measuring torque transmission capacity of the clutch engagement upon starting the vehicle.

BRIEF DESCRIPTION OF THE DRAWINGS

FIG. 3 shows the control logic of the vehicle shown in FIG. 2 while the vehicle stops, in which

FIG. 4 shows the control logic of the vehicle shown in FIG. 2 when the vehicle starts to move, in which

FIG. 5 is a time chart for the control (braking force reduction pattern 1) of a vehicle including a braking force retaining unit according to the present invention. Here, the engine of the vehicle is automatically turned off.

FIG. 6 is a time chart for the control (braking force reduction pattern 2) of a vehicle including a braking force retaining unit according to the present invention. Here, the engine of the vehicle is automatically turned off.

DESCRIPTION OF THE PREFERRED EMBODIMENTS

A braking force retaining unit according to the present invention may be applicable for all kinds of vehicles which have a braking device operable by hydraulic pressure (brake fluid pressure) and are provided with a motor. Here, the term "motor" includes an engine such as an internal combustion engine driven by gasoline and the like, Stirling engine as an external combustion engine, and an electric motor.

<Construction of Braking Force Retaining Unit>

A braking force retaining unit according to the present invention retains braking force after releasing a brake pedal. The braking force continuously acts on a vehicle until driving force for starting the vehicle increases to a certain value. In this braking force retaining unit, the braking force is decreased in accordance with the increasing driving force. Means for retaining or decreasing braking force is not restricted to a particular means. It may be constructed by a servo valve for shutting, communicating or adjusting a flow of brake fluid.

Figure 1:
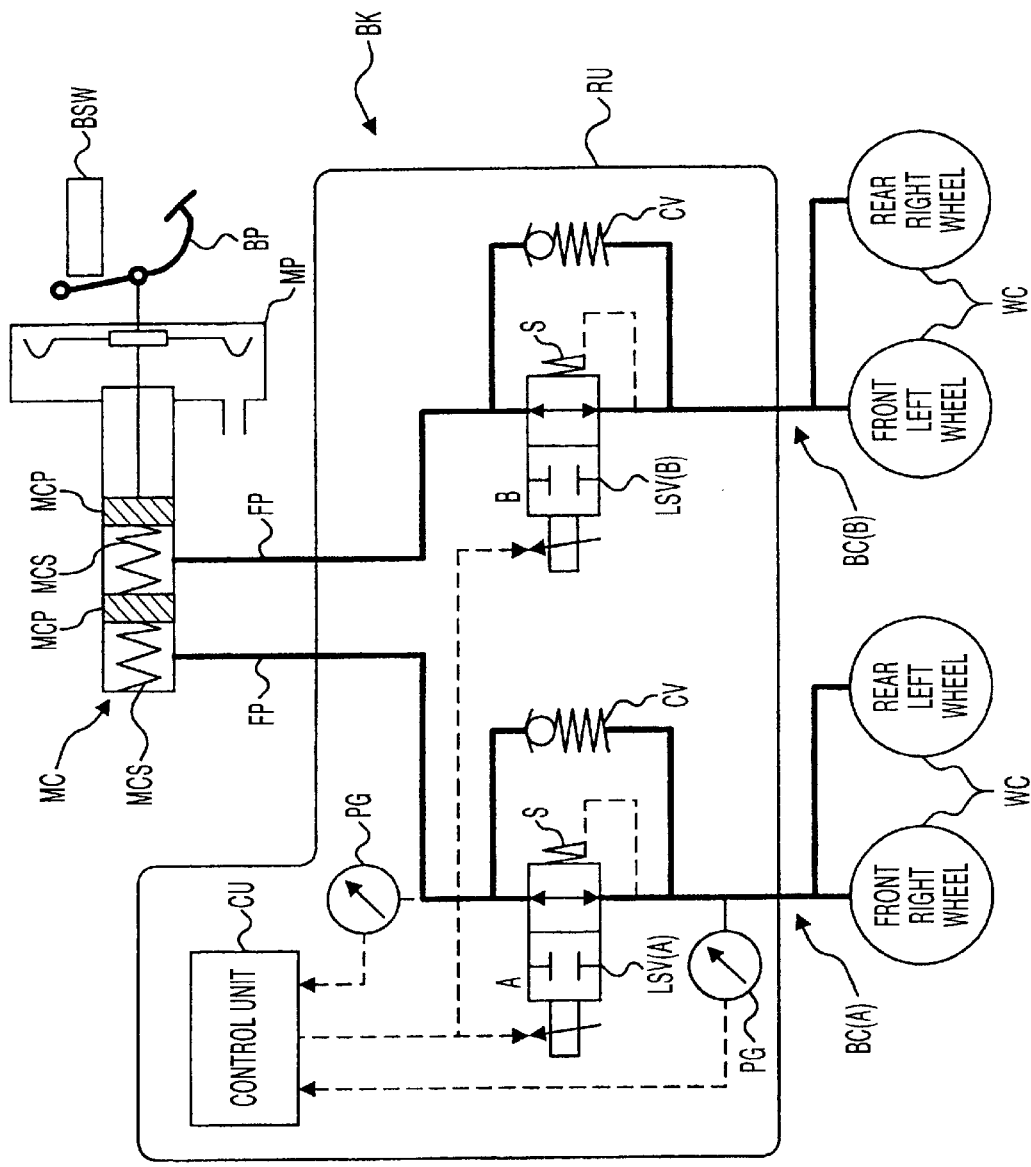
FIG. 1 shows a braking force retaining unit according to the present invention.

With reference to FIG. 1, a braking force retaining unit according to the invention will be described in relation to a hydraulically operable braking device.

A braking force retaining unit RU is incorporated in a brake fluid pressure circuit BC of a hydraulically operable braking device BK. The braking force retaining unit RU retains or decreases brake fluid pressure within a wheel cylinder WC with the use of a servo valve LSV.

<Hydraulically Operable Braking Device>

A hydraulically operable braking device will be described. A brake fluid pressure circuit BC of a hydraulically operable braking device BK comprises brake fluid piping FP connecting the braking device BK to a master cylinder MC and a wheel cylinder WC. Since brake is a very important factor for a safety run, the braking device BK has two separate systems of brake fluid pressure circuits BC(A), BC(B). Therefore, if one system is out of order, the remaining system works for obtaining a minimum braking force.

A master cylinder piston MCP is inserted into a main body of the master cylinder MC. When the driver applies a load to a brake pedal BP, the piston MCP is pressed and pressure is applied to brake fluid within the master cylinder MC so that mechanical force is converted into brake fluid pressure, i.e., the pressure applied to the brake fluid. When the driver releases the brake pedal BP for removing the applied load, the piston MCP is returned to the original position by the resilient action of a return spring MCS and the brake fluid pressure is released. In view of fail-safe mechanism, there are provided two separate brake fluid pressure circuits BC. For this reason, the master cylinder MC shown in FIG. 1 is a tandem master cylinder, where two pistons MCP, MCP are connected in series so that the main body of the master cylinder MC is divided into two portions.

A master power MP (brake booster) is provided between the brake pedal BP and the master cylinder MC so as to ease the braking effort of the driver. The master power MP shown in FIG. 1 is a vacuum servo type. The master power MP takes out negative pressure from a manifold of a non-shown engine 1 so as to facilitate the braking operation of the driver.

The brake fluid piping FP connects the master cylinder MC and the wheel cylinder WC. The brake fluid piping FP functions as a fluid channel for brake fluid. Brake fluid pressure generated at the master cylinder MC is transmitted to the wheel cylinder WC since a flow of the brake fluid travels through the brake fluid piping FP. When the brake fluid pressure within the wheel cylinder WC is greater, the brake fluid is transmitted from the wheel cylinder WC to the master cylinder MC through the brake fluid piping FP. Since separate brake fluid pressure circuits BC are provided for the reason mentioned above, there are also provided two separate brake fluid piping systems FP. The brake fluid pressure circuit BC such as constructed by the brake fluid piping shown in FIG. 1 is an X-piping type, where one brake fluid pressure circuit BC(A) is for braking a front right wheel and a rear left wheel, and the other brake fluid pressure circuit BC(B) is for braking a front left wheel and a rear right wheel. The brake fluid pressure circuit may be a front and rear dividing piping type, where one brake fluid pressure circuit is for braking front wheels, and the other brake fluid pressure circuit is for braking rear wheels.

The wheel cylinder WC is provided for each wheel so that the brake fluid pressure generated at the master cylinder MC and transmitted to the wheel cylinder WC through the brake fluid piping FP is converted into a mechanical force for braking wheels (braking force). A piston is inserted into the wheel cylinder WC so that when the piston is pressed by the brake fluid pressure, it generates a braking force for actuating brake pads in the case of disc brakes or brake shoes in the case of drum brakes.

Additionally, there may be provided hydraulic valves for controlling brake fluid pressure within the wheel cylinders of the front and rear wheels.

<Braking Force Retaining Unit>

The braking force retaining unit RU will be described. The braking force retaining unit RU comprises a servo valve LSV which is provided in the brake fluid pressure circuit BC of the hydraulically operable braking device BK so as to shut off, communicate or adjust a flow of brake fluid, thereby retaining, releasing or decreasing braking force. The braking force retaining unit RU comprises a control means (control unit CU) including a circuit for supplying the servo valve LSV with electric currents. In case of necessity, the braking force retaining unit RU further comprises a check valve CV for additionally increased brake pedal load and a brake fluid pressure gauge PG for measuring brake fluid pressure.

The servo valve LSV opens and closes the valve by electric information from the control unit CU so as to shut off, communicate or adjust a flow of brake fluid between the wheel cylinder WC and the master cylinder MC. The servo valve LSV repeatedly opens and closes the valve such that the total amount of hydraulic pressure (obtained by multiplying pilot pressure and pressurized area) and the resilient force of a spring S is equivalent to electromagnetic valve-closing force generated at a non-shown solenoid coil. Pilot pressure is hydraulic pressure within the wheel cylinder WC. For example, if the servo valve LSV is of normally open type, the valve is in open condition when the total amount of the hydraulic pressure and the resilient force is greater than the valve-closing force (electromagnetic force). The servo valves LSV, LSV of FIG. 1 are both in open condition. With the provision of the servo valve LSV, even if the driver releases the brake pedal BP upon starting the vehicle on a slope, braking force is retained and thereby preventing unintentional backward displacement. The term "unintentional back ward displacement" means that the vehicle moves in an opposite direction due to its own weight (potential energy), in other words, the vehicle begins to descend backwards on a slope.

The servo valve LSV may be of both normally open and normally closed types. However, in view of fail-safe mechanism, a normally open type is preferable. This is because when electricity is cut off due to malfunction, brake does not work or brake always works in a normally closed type servo valve LSV.

In this embodiment, conditions of the servo valve LSV are classified on the basis of a flow of brake fluid into three conditions, that is shut-off condition, flow restricting condition and communicating condition. In the shut-off condition, a certain amount of electric currents is supplied to the servo valve LSV such that the valve is kept closed. A flow of brake fluid is thus shut off in the brake fluid piping FP so as to retain brake fluid pressure within the wheel cylinder WC (braking force). A certain amount of electric currents means a necessary amount for generating valve-closing force (electromagnetic force) greater than the total amount of hydraulic pressure and the resilient force of the spring S. In the flow restricting condition, the amount of electric currents from the servo valve LSV is changed such that conditions of the valve is controlled. A flow of brake fluid from the wheel cylinder WC to the master cylinder MC is restricted so as to gradually decrease the braking force. In the communicating condition, supply of the electric currents to the servo valve LSV is ceased such that the valve is kept open. The wheel cylinder WC communicates with the master cylinder MC, allowing a flow of brake fluid. Braking force is not retained and brake fluid pressure within the wheel cylinder WC is corresponding to brake pedal load applied by the driver.

The servo valve LSV comprises a non-shown solenoid coil, plunger, valve, spring S and the like. The solenoid coil generates electromagnetic force in accordance with the amount of electric currents supplied from the control unit CU. The plunger is accommodated within the solenoid coil and is moved in to-and-fro directions by the electromagnetic force generated. The valve is connected to the plunger through a shaft and the like. The valve reciprocates with the plunger so as to open and close the brake fluid passage. The valve-closing force is based on electromagnetic force, i.e., the amount of electric currents supplied from the control unit CU. The spring S is positioned opposite to the plunger of the valve. The spring surges the valve in the valve-opening direction.

When the servo valve LSV is in communicating condition, electric currents are not supplied to the servo valve LSV from the control unit CU and electromagnetic force is not generated at the servo valve LSV. Therefore, the valve is urged by the spring S and is kept in open condition. As a result, communication is made between the wheel cylinder WC and the master cylinder MC, thereby allowing a flow of brake fluid. Braking force is not retained in the communicating condition, and brake fluid pressure within the wheel cylinder WC is corresponding to brake pedal load applied by the driver.

When the servo valve LSV is in shut-off condition, a constant amount of electric currents is supplied to the servo valve LSV from the control unit CU. In the shut-off condition, the maximum amount of electric currents is supplied. When electric currents are supplied, the plunger moves in the valve-closing direction by the electromagnetic force generated at the solenoid coil. Since the valve-closing force is greater than the amount of the hydraulic pressure and the resilient force of the spring S, the valve is kept closed so as to shut off a flow of brake fluid. As a result, brake fluid pressure is retained within the wheel cylinder WC. Braking force is therefore retained.

When the servo valve LSV is in flow restricting condition, the amount of electric currents for necessary braking force is supplied to the servo valve LSV from the control unit CU. The current supply is gradually reduced from the amount of electric currents to be supplied in the shut-off condition. Electromagnetic force to be generated is reduced accordingly. When electric currents are supplied, the plunger reciprocates in to-and-fro directions by electromagnetic force generated at the solenoid coil so as to open and close the valve. Valve-closing force is determined by the electromagnetic force generated (the amount of electric currents to be supplied). When the valve-closing force is greater than the total amount of the hydraulic pressure and the resilient force of the spring S, the valve is closed. Meanwhile, when the valve-closing force is less than the total amount of the hydraulic pressure and the resilient force of the spring S, the valve is open. As a result, a flow of brake fluid is restricted in accordance with the amount of electric currents to be supplied. Therefore, braking force gradually decreases.

The brake fluid pressure gauges PG, PG measure brake fluid pressure between the wheel cylinder WC and the servo valve LSV and brake fluid pressure between the master cylinder MC and the servo valve LSV. These two measured values are transmitted to the control unit CU. The control unit CU recognizes hydraulic pressure at the master cylinder MC and the wheel cylinder WC (braking force in the end). The control unit CU then calculates the amount of electric currents for generating the brake fluid pressure to be controlled (braking force).

A check valve CV is provided in case of necessity. The check valve CV transfers the brake fluid pressure generated within the master cylinder MC into the wheel cylinder WC on condition that the servo valve LSV is closed and the driver increases brake pedal load. The check valve CV works effectively when the brake fluid pressure generated within the master cylinder MC is greater than the brake fluid pressure within the wheel cylinder WC. The check valve CV quickly increases the brake fluid pressure within the wheel cylinder WC in accordance with the increased brake pedal load.

If an arrangement is employed such that the closed servo valve LSV is open when the brake fluid pressure within the master cylinder MC becomes greater than that within the wheel cylinder WC, there is no need to provide a check valve CV since the servo valve LSV itself responds to the increased brake pedal load.

A brake switch BSW detects whether the brake pedal BP is depressed or not, and then based on the detected value, it sends a signal to the control unit CU for opening and closing the servo valve LSV.

The control unit CU controls the servo valve LSV of the braking force retaining unit RU such that the servo valve LSV is in communicating condition, shut-off condition or flow restricting condition. The control unit CU comprises a circuit for supplying the servo valve LSV with electric currents. A various information such as driving force, hydraulic pressure at the master cylinder MC and the wheel cylinder WC, resilient force of the spring S and the like is input into the control unit CU for the adjustment of the current supply to the servo valve LSV. Conditions for changing to the communicating condition or to the shut-off condition will be described in detail later together with the control in the flow restricting condition. These conditions are judged at the control unit CU.

<Basic Operation of the Braking Force Retaining Unit>

With reference to FIG. 1, basic operation of the braking force retaining unit will be described.

(Stop/Start Operations on Up Slope)

For example, when stopping the vehicle on an up slope, the driver depresses the brake pedal BP while the vehicle is running. The brake fluid within the master cylinder MC is therefore pressed, and the brake fluid pressure within the master cylinder increases. This increased brake fluid pressure results in a flow of brake fluid, which flows from the master cylinder MC to the wheel cylinder WC through the brake fluid piping FP and the servo valve LSV in open condition (communicating condition). Therefore, the brake fluid pressure generated within the master cylinder MC is converted into braking force for braking wheels. As a result, the vehicle can stop on the slope.

The control unit CU judges conditions including the stop of the vehicle and closes the servo valve LSV (shut-off condition) so as to shut off a flow of brake fluid within the brake fluid piping FP. The brake fluid pressure within the wheel cylinder WC and thus braking force is retained. The control unit CU is not required to judge whether the vehicle is stopped on a slope or not. In the case of the arrangement where a check valve CV is provided, even if the servo valve LSV is closed, braking force is increased through the check valve CV when the driver further increases the brake pedal load.

In order to initiate the starting operation of the vehicle on the slope, the driver releases the brake pedal BP and in stead depresses the non-shown accelerator pedal. During the operation, since the servo valve LSV is closed (shut-off condition), braking force is retained. The vehicle is therefore prevented from unintentional backward displacement even if the driver releases the brake pedal BP. After releasing the brake pedal BP, the braking force retaining unit RU controls a flow of brake fluid so as to restrict the flow rate thereof (flow restricting condition) until driving force for starting the vehicle reaches to a certain value. Control of the brake fluid is carried out based on the instructions from the control unit CU by way of the servo valve LSV. The braking force is decreased in accordance with the increasing driving force of the vehicle. When reducing braking force, the control unit CU controls the braking force until the driving force required for starting the vehicle increases to a certain value such that the total amount of the increasing driving force and the reduced braking force is equal to or more than the braking force before initiating the reduction. Meanwhile the driving force in increasing while the driver depresses the accelerator pedal. The vehicle then starts to move on the slope when the driving force becomes greater than the total amount of the reduced braking force and the downward force exerted on the vehicle, which displaces the vehicle backwards on the slope due to the own weight of the vehicle.

The driver often forcefully depresses the brake pedal BP. However, provision of the servo valve LSV ensures a smooth starting operation of the vehicle even if the driver has forcefully depressed the brake pedal BP more than required. The servo valve LSV opens the valve so as to immediately decrease the brake fluid pressure within the wheel cylinder WC to a certain brake fluid pressure (relief pressure) after the driver gradually or at a time releases the brake pedal BP.

Since the braking force retaining unit RU controls the servo valve LSV until driving force of the vehicle increases to a certain value and the servo valve LSV is turned from shut-off condition to flow restricting condition so as to reduce the braking force, unnecessary braking force does not act on the vehicle and hence no brake dragging occurs. When the braking force is lost, the servo valve LSV turns in communicating condition. Further, in view of fail-safe performance, the servo valve LSV may be controlled to be open (communicating condition) at a certain period time (for example 2 to 3 seconds) or at a certain vehicle speed after releasing the brake pedal BP. Depression or release of the brake pedal BP is detected by the brake switch BSW.

(Stop/Start Operations on Down Slope)

when stopping the vehicle on a down slope, the driver depresses the brake pedal BP. The control unit CU judges conditions including the stop of the vehicle and closes the servo valve LSV (shut-off condition) so as to retain the brake fluid pressure within the wheel cylinder WC. As mentioned above, the control unit CU does not judge whether the vehicle is stopped on a slope.

In order to start off the vehicle on the down slope, the driver then releases the brake pedal BP. Normally, in a down slope, the driver does not depresses the accelerator pedal when starting the vehicle. The driver gradually or instantly releases the brake pedal BP so that the vehicle can start moving due to its own weight. According to the instructions from the control unit CU, the braking force retaining unit RU controls the servo valve LSV so as to restrict a flow of brake fluid (flow restricting condition). The braking force is reduced in accordance with increasing driving force of the vehicle. Therefore, the driver can start the vehicle without operating the accelerator pedal.

In the braking force retaining unit RU of the invention, the driver can start off the vehicle on an up slope without any difficulty. The braking force retaining unit RU does not affect a smooth start operation of the vehicle on a down slope and a flat place as well. Further, reduction of the braking force is initiated before the driving force of the vehicle reaches to a certain value and the braking force decreases in accordance with the increasing driving force of the vehicle. Therefore, the driver does not experience a sudden impact when starting the vehicles since the braking force is not released instantly. Also, brake dragging does not occur since unnecessary braking force is reduced in accordance with the increasing driving force.

EXAMPLES

The present invention will be described in greater detail by way of specific examples.

In this example, a braking force retaining unit according to the present invention is applied to an automatic transmission vehicle (hereinafter referred to as a vehicle).

The vehicle shown in this example is a hybrid vehicle having an engine and an electric motor as a driving motor, and is provided with a belt-type continuously variable transmission (hereinafter referred to as CVT) as a transmission. The braking force retaining unit RU applied to the vehicle includes a servo valve LSV in the brake fluid pressure circuit BC. This braking force retaining unit RU is the same as that shown in FIG. 1.

The vehicle is further provided with a driving force reduction apparatus or/and a driving motor stopping apparatus. The driving force reduction apparatus is for reducing creep driving force on condition that the driving motor is idling, the vehicle moves under a certain speed, and the brake pedal BP is depressed. The driving motor stopping apparatus is for automatically stopping the driving motor while the vehicle stops. Moreover, the vehicle is provided with a system for automatically initiating automatic control for generating driving force on condition that the brake pedal BP is released and the brake switch BSW is OFF.

<System Configuration>

Figure 2:
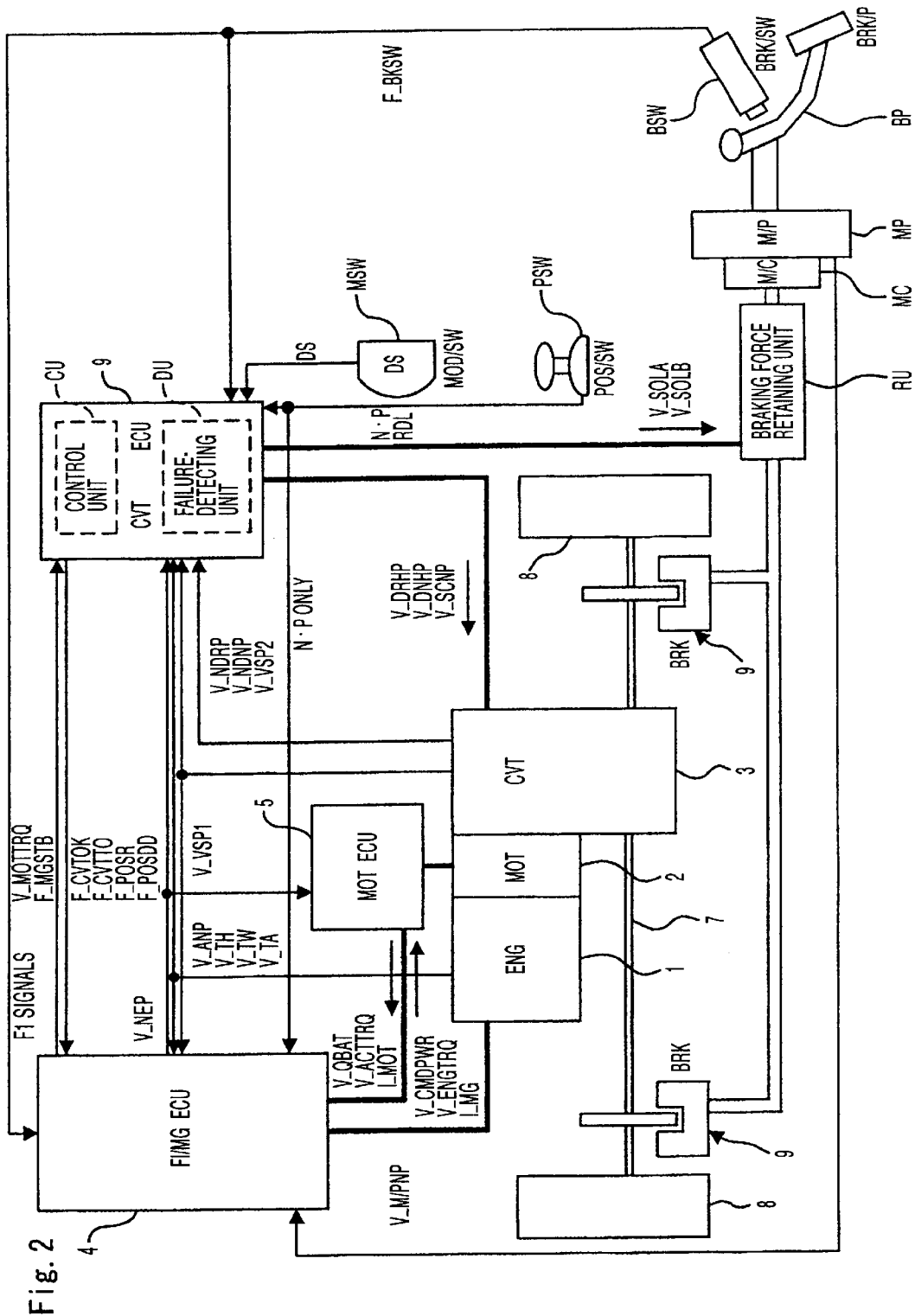
FIG. 2 shows a system configuration of a vehicle including the braking force retaining unit.

The system configuration of the vehicle will be described with reference to FIG. 2. The vehicle is provided with an engine 1 and a motor 2 as a driving motor, and a belt-type continuously variable transmission (CVT 3) as a transmission. The engine 1 is controlled at a fuel injection electronic control unit (hereinafter referred to as FI ECU). The FI ECU is integrally constructed with a management electronic control unit (hereinafter referred to as MG ECU), and it is equipped in a fuel injection/ management electronic control unit 4 (hereinafter referred to as FI/MG ECU). The motor 2 is controlled at a motor electronic control unit 5 (hereinafter referred to as MOT ECU). Further, the CVT 3 is controlled at a CVT electronic control unit 6 (hereinafter referred to as CVT ECU).

A drive axle 7 provided with driving wheels 8, 8 is mounted to the CVT 3. Each driving wheel 8 is provided with a disc brake 9, which includes the wheel cylinder WC and the like (FIG. 1). The wheel cylinders WC of the disc brakes 9,9 are connected to the master cylinder MC through the braking force retaining unit RU. When the driver depresses the brake pedal BP, brake pedal load generated is transmitted to the master cylinder MC through the master power MP. The brake switch BSW detects whether the brake pedal BP is depressed or not.

The engine 1 is an internal combustion engine, which makes use of thermal energy. The engine 1 drives the driving wheels 8, 8 through the CVT 3 and the drive axle 7. In order to improve fuel economy, the engine 1 may be automatically turned off when the vehicle stops. For this reason, the vehicle is provided with a driving motor stopping apparatus for automatically turning off the engine 1 when certain automatic engine stop conditions are satisfied.

The motor 2 has an assist mode for the assist of the engine drive with the use of electric energy from a non-shown battery. The motor 2 has a regeneration mode for converting the kinetic energy derived from the rotation of the drive axle 7 into electric energy. When the engine does not require the assist from the assist mode (such as for starting on a down slope or deceleration of the vehicle), the thus converted electric energy is stored in a non-shown battery. Further, the motor 2 has an actuation mode for actuating the engine 1.

The CVT 3 includes an endless belt winded between a drive pulley and a driven pulley so as to enable continuously variable gear ratio by changing a winding radius of the endless belt. Change of the winding radius is achieved by changing each pulley width. The CVT 3 engages the clutch and an output shaft so as to transmit the output of the engine 1 converted by the endless belt into the drive axle 7 through gears at the output side of the clutch. The vehicle equipped with the CVT 3 enables creep running, and such a vehicle requires a driving force reduction apparatus for reducing the driving force to be utilized for the creep running. Driving force of the creep running is adjustable by the engaging force of the clutch. The driving force of the creep running is adjusted for two conditions, i.e., strong driving force and weak driving force. The strong driving force is equivalent to a driving force to keep the vehicle stationary on the slope at an inclination angle of 5 degrees. This is called "strong creep" in this example. In this example, a certain value of the driving force upon starting the vehicle is defined as a driving force value in the strong creep condition. In the weak driving force, almost no driving force is obtained. This is called "weak creep" in this example. In the strong creep, when the accelerator pedal is released (i.e., the vehicle is in idling condition) and a positioning switch selects a running range (D range, L range or R range), the vehicle moves slowly after releasing the brake pedal BP as if the vehicle creeps on the ground. In the weak creep, however, when the vehicle moves under a certain low speed and the brake pedal BP is depressed, the vehicle stops or moves at a very low speed.

Range positions of the positioning switch PSW are selected by a shift lever. Such range positions are selected from P range to be used for parking the vehicle, N range as a neutral range, R range for backward running, D range to be used for a normal run, and L range to be used for obtaining a sudden acceleration or strong engine brake. The term "running range" indicates a range position, at which the vehicle can move. In this vehicle, the running range includes D range, L range and R range. Further, when the positioning switch PSW selects the D range, D mode as a normal running mode and S mode as a sports mode can be selected by a mode switch MSW.

FI ECU contained in the FI/MG ECU 4 controls the amount of fuel injection so as to achieve the optimum air fuel ratio, and it also generally controls the engine 1. Various kinds of information such as a throttle angle and conditions of the engine 1 is transmitted to the FI ECU such that the engine 1 is controlled based on such information. The MG ECU contained in the FI/MG ECU 4 mainly controls the MOT ECU 5 as well as judges the automatic engine stop condition and the automatic engine actuation condition. The MG ECU receives information as to conditions of the motor 2 and other information such as conditions of the engine 1 from the FI ECU, and based on such information it sends instructions about the mode switching of the motor 2 to the MOT ECU 5. Further, the MG ECU receives information such as conditions of the CVT 3, conditions of the engine 1, range information of the positioning switch PSW, conditions of the motor 2 and the like, and based on such information it judges whether the engine 1 should be automatically stopped or automatically actuated.

The MOT ECU 5 controls the motor 2 based on a control signal from the FI/MG ECU 4. The control signal from the FI/MG ECU 4 includes mode information instructing actuation of the engine 1 by the motor 2, assistance of the engine actuation or regeneration of electric energy, and an output required value to the motor 2, and the MOT ECU 5 sends an order to the motor 2 based on such information. Further, the MOT ECU 5 receives information from the motor 2 and transmits information such as the amount of generated energy or the capacity of the battery to the FI/MG ECU 4.

The CVT ECU 6 controls the transmission gear ratio of the CVT 3, the engagement force of the clutch and the like. Various kinds of information such as conditions of the CVT 3, conditions of the engine 1, range information of the positioning switch PSW and the like is transmitted to the CVT ECU 6, and based on such information the CVT ECU 6 transmits a signal to the CVT 3, the signal of which includes the control of hydraulic pressure of each cylinder provided at the drive pulley and the driven pulley of the CVT 3, and the control of hydraulic pressure of the clutch. The CVT ECU 6 also judges whether the creep driving force should be strong or weak. The CVT ECU 6 further controls the servo valves LSV, LSV of the braking force retaining unit RU and has a circuit for supplying the servo valves LSV, LSV with electric currents. Further, the CVT ECU 6 is equipped with a failure-detecting unit DU for the purpose of detecting malfunction of the braking force retaining unit RU.

The disk brakes 9, 9 are constructed such that a disk rotor rotatable with the driving wheel 8 is pressed between the brake pads moved by the wheel cylinder WC (FIG. 1) and braking force is obtained by the frictional force therebetween. The brake fluid pressure within the master cylinder MC is transmitted to the wheel cylinder WC through the braking force retaining unit RU.

With the provision of the braking force retaining unit RU the brake fluid pressure within the wheel cylinder WC keeps on acting after releasing the brake pedal BP. The braking force retaining unit RU comprises a control unit CU equipped in the CVT ECU 6. The servo valves LSV, LSV used in this example are of normally open type.

The master cylinder MC, master power MP, brake switch BSW and the like are the same as those previously described.

The driving force reduction apparatus equipped in the vehicle comprises the CVT 3 and the CVT ECU 6. When the brake pedal BP is depressed and the vehicle moves under 5 km/h (under a certain low speed), the driving force reduction apparatus reduces the creep driving force from the strong creep to the weak creep. The driving force reduction apparatus judges whether the brake pedal BP is depressed. This is carried out at the CVT ECU 6 based on a signal from the brake switch BSW. The driving force reduction apparatus also judges from vehicle speed pulse whether the vehicle moves under 5 km/h. In addition to the above two basic conditions, the CVT ECU 6 further judges other conditions in that the brake fluid temperature is over a certain value, the braking force retaining unit RU is normal, and that the positioning switch PSW of the braking force retaining unit RU is in the D range. When the CVT ECU 6 judges all the above five conditions, the driving force is decreased. Since the driving force reduction apparatus reduces the driving force, deteriorated fuel consumption of the vehicle is prevented. When the vehicle stops and is in weak creep, the CVT ECU 6 judges the conditions for the strong creep. When the conditions for the strong creep are satisfied, the CVT ECU 6 sends an order to the CVT 3 for increasing the engaging force of the clutch, thereby increasing the creep driving force.

The driving motor stopping apparatus equipped in the vehicle comprises the FI/MG ECU 4. The driving motor stopping apparatus automatically turns off the engine 1 when the vehicle stops. At the MG ECU of the FI/MG ECU 4 the driving motor stopping apparatus judges the conditions for automatically turning off the engine such as the vehicle speed of 0 km/h. The automatic stop conditions of the engine will be described later. When all of the automatic stop conditions of the engine are satisfied, the FI/MG ECU 4 sends an engine stop order to the engine 1 so as to automatically turn off the engine 1. Since the driving motor stopping apparatus automatically turns off the engine, deteriorated fuel consumption of the vehicle is prevented.

The MG ECU of the FI/MG ECU 4 judges the automatic actuation conditions of the engine while the driving motor stopping apparatus automatically turns off the engine 1. When all of the automatic actuation conditions of the engine are satisfied, the FI/MG ECU 4 sends an engine actuation order to the MOT ECU 5. The MOT ECU 5 further transmits an engine actuation order to the motor 2. The motor 2 then automatically actuates the engine 1, and at the same time the vehicle turns in strong creep condition. The automatic actuation conditions of the engine will be described later.

Signals to be transmitted and received in this system will be described. With reference to FIG. 2, the letter "F__" in front of each signal indicates that the signal is flag information, which is either 0 or 1. The letter "V__" indicates that the signal is numerical information (unit is optional), and the letter "I__" indicates that the signal includes plural kinds of information.

A signal transmitted from the FI/MG ECU 4 to the CVT ECU 6 will be described. V__MOTTRQ represents an output torque value. F__MGSTB is a flag showing whether all of the engine stop conditions (hereinafter described) except for the five conditions of F__CVTOK are satisfied. If all the conditions are satisfied, the numeral 1 is given, and if not, the numeral 0 is given. When the F__MGSTB and the F__CVTOK are both turned to 1, the engine 1 is automatically turned off. When one of these flags is turned to 0, the engine 1 is automatically turned on.

A signal transmitted from the FI/MG ECU 4 to the CVT ECU 6 and the MOT ECU 5 will be described. V__NEP represents engine speed.

A signal transmitted from the CVT ECU 6 to the FI/MG ECU 4 will be described. F__CVTOK is a flag showing whether five conditions are satisfied, the conditions of which includes (1) the CVT 3 is in weak creep, (2) ratio of the CVT 3 (pulley ratio) is low, (3) oil temperature of the CVT 3 is over a certain value, (4) brake fluid temperature is over a certain value, and (5) the brake fluid pressure retaining unit RU is normal. When all of the five conditions are satisfied, the numeral 1 is given, and if not, the numeral 0 is given. While the engine 1 is turned off, the above conditions (1) to (4) are maintained and the F__CVTOK is judged merely from the condition (5) that is whether the brake fluid pressure retaining unit RU is normal. When the engine 1 is turned off and the brake fluid pressure retaining unit RU is normal, the F__CVTOK is 1. When the brake fluid pressure retaining unit RU is out of order, the F__CVTOK is 0.

F__CVTTO is a flag showing a condition whether oil temperature of the CVT 3 is over a certain value. If the oil temperature is at the certain value or more, the numeral 1 is given, and if the oil temperature is below the value, the numeral 0 is given. Oil temperature of the CVT 3 is obtained from an electrical resistance value of the linear solenoid controlling the hydraulic pressure of the clutch in the CVT 3. F__POSR is a flag showing a condition whether the positioning switch PSW is selected in the R range. If the positioning switch PSW selects the R range, the numeral 1 is given, and if not, the numeral 0 is given. F__POSDD is a flag showing a condition whether the positioning switch PSW selects the D range and the mode switch MSW selects the D mode. If the D range and the D mode (D range/D mode) are selected, the numeral 1 is given, and if not, the numeral 0 is given. When the FI/MG ECU 4 does not receive any information indicating the D range/D mode, R range, P range or the N range, the FI/MG ECU 4 judges either the D range/S mode or the L range is selected.

A signal transmitted from the engine 1 to the FI/MG ECU 4 and the CVT ECU 6 will be described. V__ANP represents a negative pressure value at the intake pipe of the engine 1. V__TH represents a throttle angle. V__TW represents a temperature of the cooling water at the engine 1. V__TA represents an intake temperature of the engine 1. Brake fluid temperature in the braking force retaining unit RU, which is disposed within the engine compartment is obtained from the intake temperature. This is because both temperatures change with respect to the temperature at the engine compartment.

A signal transmitted from the CVT 3 to the FI/MG ECU 4 and the CVT ECU 6 will be described. V__VSP1 represents a vehicle speed pulse from one of the two vehicle speed pickups provided in the CVT 3. Vehicle speed is calculated based on the vehicle speed pulse.

A signal transmitted from the CVT 3 to the CVT ECU 6 will be described. V_NDRP represents a pulse showing the number of revolutions of the drive pulley provided at the CVT 3. V_NDNP represents a pulse showing the number of revolutions of the driven pulley provided at the CVT 3. V_VSP2 represents a vehicle speed pulse from the other vehicle speed pickup at the CVT3. The V_VSP2 is more accurate than the V_VSP1, and the V_VSP2 is used for calculating the amount of clutch slipping at the CVT 3.

A signal transmitted from the MOT ECU 5 to the FI/MG ECU 4 will be described. V_QBAT represents a remaining capacity of the battery. V_ACTTRQ represents an output torque value of the motor 2, which is the same as the V_MOTTRQ. I_MOT represents information such as the amount of generated energy of the motor 2 showing electric loading. The motor 2 generates all the electric power consumed for the vehicle including the electric power for driving the motor.

A signal transmitted from the FI/MG ECU 4 to the MOT ECU 5 will be described. V_CMDPWR represents an output required value to the motor 2. V_ENGTRQ represents an output torque value of the engine 1. I_MG represents information such as the actuation mode, assist mode and the regeneration mode with respect to the motor 2.

A signal transmitted from the master power MP to the FI/MG ECU 4 will be described. V_M/PNP represents a negative pressure detected value at a constant pressure chamber of the master power MP.

A signal transmitted from the positioning switch PSW to the FI/MG ECU 4 will be described. N or P is transmitted as positioning information when the positioning switch PSW selects either the N range or the P range.

A signal transmitted from the CVT ECU 6 to the CVT 3 will be described. V_DRHP represents a hydraulic pressure command value transmitted to the linear solenoid valve, which controls the hydraulic pressure within the cylinder of the drive pulley at the CVT 3. V_DNHP represents a hydraulic pressure command value transmitted to the linear solenoid valve, which controls the hydraulic pressure within the cylinder of the driven pulley at the CVt 3. The transmission gear ratio of the CVT 3 is changed by the V_DRHP and the V_DNHP. V_SCHP represents a hydraulic pressure command value transmitted to the linear solenoid valve, which controls the hydraulic pressure of the clutch at the CVT 3. The driving force of the vehicle is calculated from the V_SCHP. The engaging force of the clutch is changed by the V_SCHP.

A signal transmitted from the CVT ECU 6 to the braking force retaining unit RU will be described. V_SOLA represents electric currents supplied to the servo valve LSV(A) of the braking force retaining unit RU (shown in FIG. 1) so as to open and close the valve. V_SOLB represents electric currents supplied to the servo valve LSB(B) of the braking force retaining unit RU (shown in FIG. 1) so as to open and close the valve.

A signal transmitted from the positioning switch PSW to the CVT ECU 6 will be described. The positioning switch PSW selects the N range, P range, R range, D range or the L range, and the selected range is transmitted as positioning information.

A signal transmitted from the mode switch MSW to the CVT ECU 6 will be described. The mode switch MSW selects either D mode (normal running mode) or S mode (sports running mode), and the selected mode is transmitted as mode information. The mode switch MSW is a mode selection switch, which works when the positioning switch PSW is set in the D range.

A signal transmitted from the brake switch BSW to the FI/MG ECU 4 and the CVT ECU 6 will be described. F_BKSW is a flag showing the condition whether the brake pedal BP is depressed (ON) or released (OFF). If the brake pedal BP is depressed, the numeral 1 is given, and if the brake pedal is released, the numeral 0 is given.

<Conditions for Retaining Braking Force>

Figure 3A:
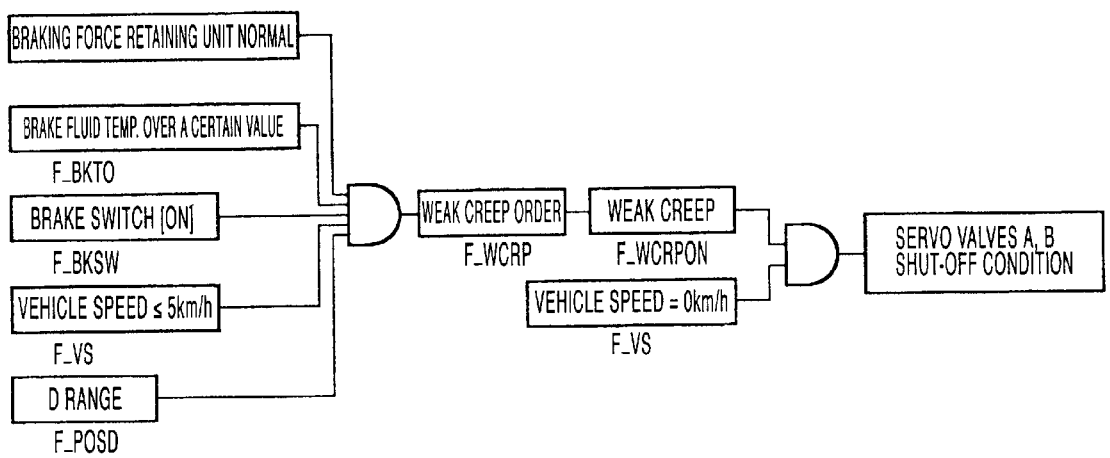
FIG. 3A shows the logic for shutting off a servo valve while the vehicle is in weak creep condition.

In the vehicle having the above system configuration, conditions that brake fluid pressure and thus braking force is retained by the braking force retaining unit RU will be described. As shown in FIG. 3A, such conditions includes (I) the driving force of the vehicle is in weak creep and (II) the vehicle speed becomes 0 km/h. When these conditions are satisfied, the two servo valves LSV, LSV (servo valves A and B) are both closed (shut-off condition), thereby retaining the brake fluid pressure within the wheel cylinder WC. When the servo valve LSV is in shut-off condition, the control unit CU supplies a constant amount of electric currents. The driving force turns in weak creep condition (F_WCRPON= 1) after a weak creep order (F_WCRP=1) is transmitted.

(I) "Weak creep" is required for the reason that the driver has to forcefully depress the brake pedal BP on a slope. The driver can stop the vehicle on the slope without forcefully depressing the brake pedal BP since in the strong creep sufficient driving force can be obtained so as to keep the vehicle stationary on the slope at an inclination angle of 5 degrees. Therefore, the driver may have been slightly depressing the brake pedal BP. In this circumstance, if the servo valve LSV is closed and the engine is turned off, the vehicle will unintentionally displace backwards.

(II) "the vehicle speed of 0 km/h" is required since the driver can not select a position for parking the vehicle if the servo valve LSV is closed during the vehicle is running.

[Conditions for Weak Creep Order]

As shown in FIG. 3A, a weak creep order is transmitted when all the following conditions are satisfied, i.e., (1) the braking force retaining unit RU is normal, (2) brake fluid temperature is over a certain value (F_BKTO), (3) the brake pedal BP is depressed and the brake switch BSW is ON (F_BKSW), (4) vehicle speed is less than 5 km/h (F_VS), and (5) the positioning switch PSW is in the D range (F_POSD). As mentioned above, the reason that the driving force is kept in weak creep is for reminding the driver of depressing the brake pedal BP forcefully. However, this is also for improving fuel consumption.

(1) The weak creep order is not transmitted when the brake fluid pressure retaining unit RU is not normal. If the weak creep order is transmitted irrespective of abnormal conditions, for example the servo valve LSV does not close, and the vehicle is in weak creep, the vehicle will unintentionally displace backwards on a slope after the driver releases the brake pedal BP. This is because brake fluid pressure is not retained within the wheel cylinder WC and the braking force is suddenly lost after releasing the brake pedal BP. A smooth starting operation on the slope without unintentional backward displacement of the vehicle is therefore achieved by the strong creep condition of the vehicle.

(2) The weak creep order is not transmitted when the brake fluid temperature is less than a certain value. When the brake fluid temperature is low, viscosity of the brake fluid is high and the brake fluid flows very slowly compared to the brake fluid at temperatures over the certain value. For this reason, when the brake fluid is at a low temperature, the vehicle is kept in strong creep condition and is prohibited to be in weak creep condition so as to prevent the vehicle from unintentional backward displacement. If the strong creep condition is maintained, the braking force retaining unit RU does not actuate and the servo valve LSV is not closed.

The braking force retaining unit RU having a servo valve LSV can control the ON-and-OFF conditions of the valve even if the brake fluid temperature is included in the conditions for controlling the valve. Therefore, the condition that the brake fluid temperature is over a certain value may be removed from the conditions for the weak creep order.

(3) The weak creep order is not transmitted when the brake pedal BP is not depressed (F_BKSW). This is because the driver does not intend reduction of the driving force.

(4) The weak creep order is not transmitted when the vehicle speed is at 5 km/h or more. This is because driving force of the driving wheels 8,8 is transmitted to the engine 1 or the motor 2 through the clutch so as to obtain engine brake or carry out regenerative power generation by the motor.

(5) When the positioning switch PSW is in the R range or L range and is not in the D range, the weak creep order is not transmitted. This is for facilitating steering operation of the vehicle at a garage with the vehicle kept in the strong creep condition.

Judgment whether the vehicle is in weak creep is carried out based on the hydraulic pressure command value with respect to the clutch of the CVT. The flag F_WCRPON showing the weak creep condition is maintained until the vehicle again turns in strong creep condition.

[Conditions for Automatically Turning Off the Engine]

Figure 3B:
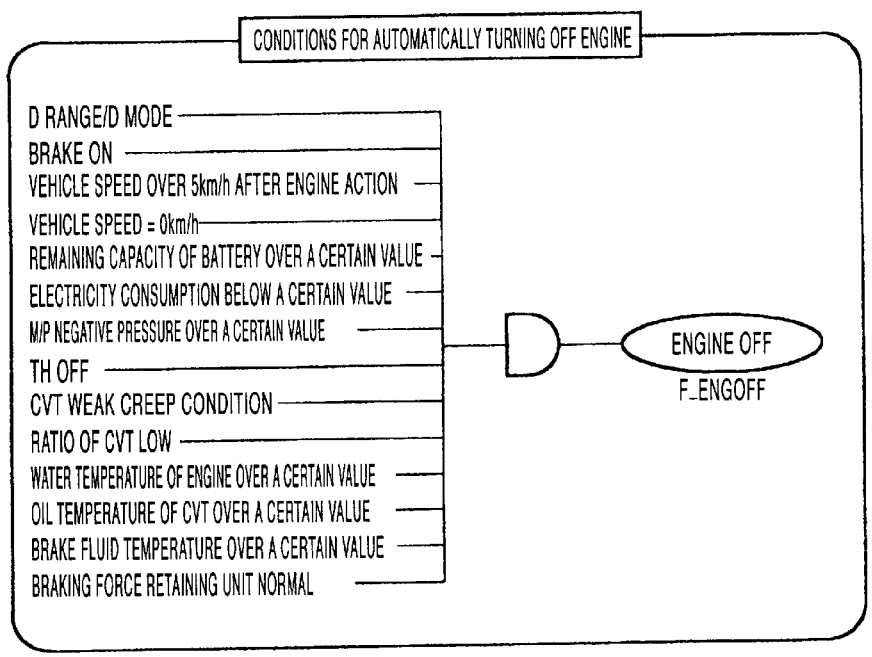
FIG. 3B shows the logic for automatically turning off the engine.

In order to improve fuel consumption, the driving motor automatic stopping apparatus automatically turns off the engine 1 while the vehicle stops. Conditions required for automatically turning off the engine 1 will be described below. When all the following conditions are satisfied, the engine stop order (F_ENGOFF) is transmitted and the engine 1 is automatically turned off (FIG. 3B).

(1) The positioning switch PSW selects the D range and the mode switch MSW selects the D mode (hereinafter referred to as "D range/D mode"). Except for the D range/D mode, the engine 1 is not automatically stopped as long as the ignition switch is turned off. This is because if the engine 1 is stopped notwithstanding that the positioning switch PSW is in the P range or the N range, the driver may consider that the ignition switch is off and he may leave the vehicle.

When the positioning switch PSW selects the D range and the mode switch MSW selects the S mode (hereinafter referred to as "D range/S mode"), automatic turning off operation of the engine 1 is not carried out. This is because the driver is expecting a quick start operation of the vehicle in the D range/S mode. The engine 1 is not automatically stopped when the positioning switch PSW is in the L range or the R range. This is because the steering operation at the garage will be time-consuming if the engine stops frequently.

(2) The brake pedal BP is depressed and the brake switch BSW is ON. This is for warning the driver. The driver puts his foot on the brake pedal BP when the brake switch BSW is ON. Therefore, if the engine 1 is stopped and the driving force is lost, the driver can easily increase a brake pedal load before the vehicle unintentionally displaces backwards on a slope.

(3) After the engine is actuated, the vehicle speed is once reaches to 5 km/h. This is for facilitating the steering operation at the garage while the vehicle moves in the creep running. The steering operation at the garage will be time consuming if the engine 1 is turned off whenever the vehicle stops for changing steering directions.

(4) Vehicle speed is 0 km/h. Driving force is not required when the vehicle stops.

(5) Capacity of the battery is more than a certain value. If the remaining capacity of the battery is not enough to restart the engine 1, the motor cannot actuate the engine 1 after turning off the engine.

(6) Electricity consumption is below a certain value. This is for securing sufficient electrical supply to loads. The engine 1 can be stopped if the electricity consumption is below a certain value.

(7) Load of the constant pressure chamber of the master power MP is over a certain value. Since negative pressure in the constant pressure chamber is obtained from the intake pipe of the engine 1, negative pressure in the constant pressure chamber becomes far smaller if the engine 1 is stopped at smaller negative pressures. This leads to reduced amplification of the brake load when the driver depresses the brake pedal BP, and hence resulting in deteriorated braking performance.

(8) The accelerator pedal is not depressed. Since the driver does not intend further increment of the driving force, the engine 1 may be automatically stopped.

(9) The CVT is in weak creep. This is for reminding the driver of depressing the brake pedal BP forcefully so as to prevent the vehicle from unintentionally displacing backward upon turning off the engine 1. While the engine 1 actuates, backward displacement of the vehicle is prevented by the total amount of the braking force and the creep driving force. In the strong creep condition, the driver may insufficiently depress the brake pedal BP. Therefore, the vehicle is kept in weak creep before the engine 1 is turned off.

(10) Ratio of the CVT is low. Unless the ratio of the CVT (pulley ratio) is low, the engine 1 is not automatically turned off. In order to achieve a smooth starting operation, the engine 1 is turned off when the ratio of the CVT is low.

(11) Water temperature of the engine is over a certain value. This is because turning on and turning off operation should be carried out when the engine 1 is in stable conditions. In a cold area, if the water temperature is low, the engine 1 may not restart. Therefore, the automatic turning off operation of the engine 1 is not carried out unless the water temperature is sufficiently high.

(12) Oil temperature of the CVT is over a certain value. If the oil temperature of the CVT is low, start-up for the hydraulic pressure of the clutch will cause a delay. Therefore, the required time from actuation of the engine 1 to the strong creep condition is extended, and the vehicle will displace backwards on a slope. For this reason, the engine 1 is not turned off when the oil temperature of the CVT is low.

(13) Brake fluid temperature is over a certain value. When the brake fluid temperature is low, viscosity of the brake fluid is high and the brake fluid flows very slowly compared to the brake fluid at temperatures over the certain value. For this reason, when the brake fluid is at a low temperature, the braking force retaining unit RU does not actuate. The vehicle is kept in strong creep condition so as to prevent unintentional backward displacement, and the automatic engine stop operation and the switching operation to the weak creep condition are prohibited.

The braking force retaining unit RU having a servo valve LSV can control the ON-and-OFF conditions of the valve even if the brake fluid temperature is included in the conditions for controlling the valve. Therefore, the condition that the brake fluid temperature is over a certain value may be removed from the conditions for automatically turning off the engine.

(14) The brake fluid pressure retaining unit RU is normal. Since braking force may not be retained if the braking force retaining unit RU is out of order, the strong creep condition is kept for preventing the vehicle from unintentional backward displacement on a slope. The automatic engine stop operation is not carried out if the braking force retaining unit RU is out of order. Meanwhile, if the braking force retaining unit RU is normal, the engine 1 is automatically turned off.

<Conditions for Releasing Braking Force>

Figure 4A:
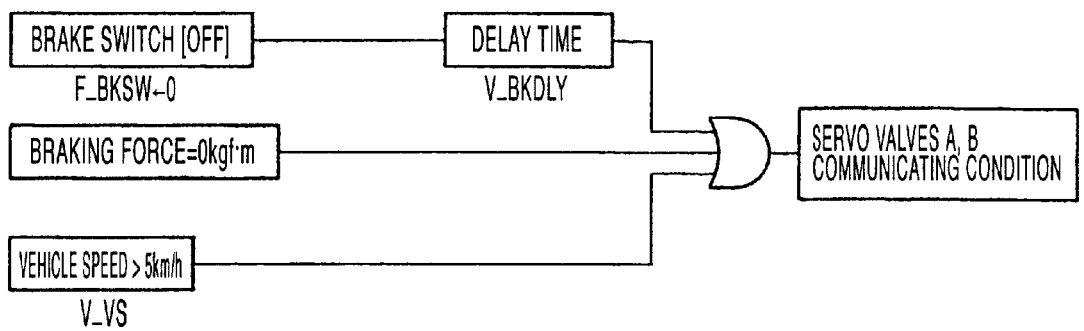
FIG. 4A shows the logic for communicating the servo valve.

As shown in FIG. 4A, the servo valve LSV is switched from shut-off condition to communicating condition for releasing the brake fluid pressure within the wheel cylinder WC on condition that any of the following conditions is satisfied: (I) a certain delay time has been passed after releasing the brake pedal BP, (II) braking force is zero, and (III) vehicle speed is over 5 km/h. When the servo valve LSV is in communicating condition, the control unit CU does not supply the servo valve LSV with electric currents. In the condition (II), the servo valve LSV is kept in flow restricting condition in the process from the shut-off condition to the communicating condition such that the brake fluid pressure within the wheel cylinder WC (braking force) is decreased in accordance with increasing driving force for starting the vehicle.

(I) Count of the delay time starts after the brake pedal BP is released (when the brake switch BSW is OFF). The delay time is about 2 to 3 seconds. As a fail-safe action, the servo valve LSV is open (communicating condition) after a certain delay time, thereby preventing brake dragging.

(II) In the flow restricting condition, braking force is reduced in accordance with increasing driving force of the vehicle, and when the braking force falls to zero, the driving force of the vehicle is such that the vehicle can be parked against a slope having an inclination angle of 5 degrees. For this reason, there is no need to retain the brake fluid pressure within the wheel cylinder WC so as to prevent the vehicle from unintentional backward displacement.

(III) The servo valve LSV is open (communicating condition) when the vehicle speed is over 5 km/h. This is for preventing unnecessary brake dragging as a fail-safe action.

[Conditions for Strong Creep Order]

Figure 4B:
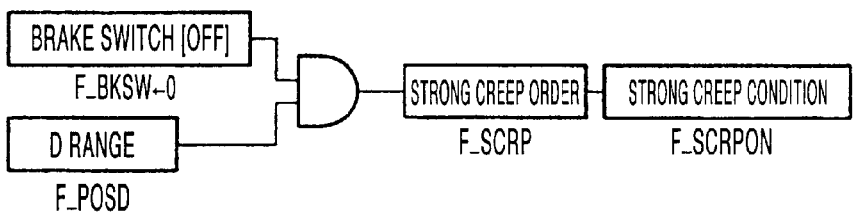
FIG. 4B shows the control logic for turning the vehicle in strong creep condition.

As shown in FIG. 4B, a strong creep order is transmitted when all the following conditions are satisfied, i.e., (1) the brake pedal BP is released and the brake switch BSW is OFF (F_BKSW), (2) the positioning switch PSW is in the D range (F_POSD). When the above two conditions are satisfied, it is considered that the driver initiates a starting operation of the vehicle. Therefore, the strong creep order (F_SCRP) is transmitted and the vehicle is kept in the strong creep condition (F_SCRPON).

[Conditions for Automatically Turning On the Engine]

Figure 4C:
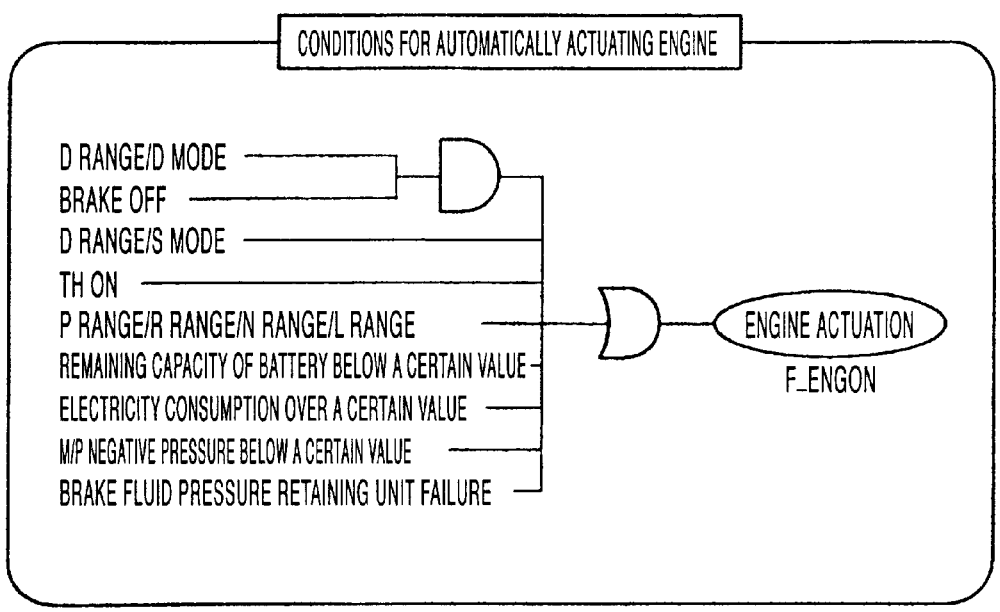
FIG. 4C shows the logic for automatically starting the engine.

After automatically turning off the engine 1, the engine 1 is automatically restarted in the following conditions. These conditions will be described with reference to FIG. 4C. The engine 1 is automatically actuated if any of the following conditions is satisfied.

(1) D range/D mode is kept and the brake pedal BP is released. Since this is considered that the driver has initiated the starting operation, the engine 1 is automatically actuated.

(2) D range/S mode is selected. When the D range/S mode is selected while the engine 1 has been automatically turned off in the D range/D mode, the engine 1 is automatically actuated. Since the driver is expecting a quick start of the vehicle in the D range/S mode, the engine 1 is automatically actuated irrespective of the brake pedal release.

(3) Accelerator pedal is depressed. This is because the driver is expecting the driving force by the engine 1.

(4) P range, N range, L range or R range is selected. When the P range is selected while the engine 1 has been automatically turned off in the D range/D mode, the engine 1 is automatically actuated. If the engine 1 is not automatically actuated upon switching to the P range or the N range, the driver may consider that the ignition switch was already turned off or that he does not have to turn off the ignition switch, and he may leave the vehicle. In order to prevent such a mistake and ensure failsafe performance, the engine 1 is restarted when any of these ranges is selected. Meanwhile, the engine 1 is also automatically actuated when the L range or the R range is selected since such a switching operation is considered that the driver intends to start the vehicle.

(5) Remaining capacity of the battery is below a certain value. The engine 1 is not turned off unless the remaining capacity of the battery is over a certain value. However, capacity of the battery may lower after the engine 1 is automatically turned off. In this case, the engine 1 is automatically actuated for the purpose of the battery charge. The certain value is set to be higher than the critical battery capacity, below which the engine 1 is not actuated.

(6) Electricity consumption reaches to a certain value. While electricity consumers such as lights are working on, capacity of the battery decreases quickly. As a result, the engine 1 will not be restarted. For this reason, irrespective of the remaining capacity of the battery, the engine 1 is automatically actuated when the electricity consumption is over a certain value.

(7) Negative pressure of the master power MP is below a certain value. The lower the negative pressure at the master power MP, the less braking force is obtained. Therefore, the engine 1 is restarted for securing sufficient braking force.

(8) The braking force retaining unit RU is out of order. When the servo valve LSV or the control unit CU is out of order, the engine 1 is actuated and the vehicle is kept in the strong creep condition. If the engine 1 is turned off and failure is detected in the braking force retaining unit RU comprising the control unit CU, the engine 1 is automatically actuated such that the driving force of the vehicle is kept in strong creep condition. This is because brake fluid pressure may not be retained or decreased after releasing the brake pedal BP upon starting the vehicle. In other words, the strong creep prevents the vehicle from unintentional backward displacement and facilitates a smooth starting operation of the vehicle.

<Conditions for Reducing Braking Force>

The servo valve LSV initiates reduction of the braking force before the driving force is turned in strong creep condition, and it reduces the brake fluid pressure within the wheel cylinder WC in accordance with the increasing driving force of the vehicle. In the flow restricting condition of the servo valve LSV, necessary amount of electric currents for generating the braking force is supplied from the control unit CU. The braking force decreases in the flow restricting condition. However, since the braking force is controlled in such a way that the total amount of the increased driving force and the decreased braking force is sufficient to keep the vehicle stationary on a slope having an inclination angle of 5 degrees, the vehicle does not displace backwards on the slope. Control of the servo valve LSV in the flow restricting condition will be described in relation to the following time charts.

<Time Chart for Control (1) with Automatic Engine Stop Operation>

With reference to FIG. 5, the way of control will be described for a vehicle having the above system configuration. The vehicle is operated in the order of braking, stopping and starting. When starting the vehicle, the servo valve LSV is controlled in the order of shut-off condition, flow restricting condition and communicating condition. Control of the servo valve LSV will be described with reference to the flow chart of FIG. 11. During the operation, the driving force reduction apparatus decreases the driving force to the weak creep condition and the driving motor stopping apparatus automatically turns off the engine 1. The positioning switch PSW and the mode switch MSW of the vehicle are not changed from the D range/D mode.

The time chart of FIG. 5 shows a relation in time sequence between driving force and braking force of the vehicle, in which a thick line indicates driving force and a thin line indicates braking force.

As shown in FIG. 5, when the driver depresses the brake pedal BP while the vehicle is running (Brake Switch [ON]), braking force is increasing. Since the driver releases the accelerator pedal when he depresses the brake pedal BP, the driving force is gradually decreasing to the strong creep condition (normal idling). When the driver continuously depresses the brake pedal BP and the vehicle speed decreases below 5 km/h, the weak creep order (F_WCRP) is transmitted. The driving force further decreases and then turns in weak creep condition (F_WCRPON).

When the vehicle speed falls to 0 km/h, the servo valve LSV is closed (shut-off condition) (S101 of FIG. 11) and the engine 1 is automatically turned off (F_ENGOFF) so that the driving force is lost. Brake fluid pressure is retained within the wheel cylinder WC while the servo valve LSV is closed (shut-off condition). Meanwhile, since the engine 1 is turned off after the driving force turns in weak creep condition, the driver depresses the brake pedal BP in order to prevent unintentional backward displacement of the vehicle. Therefore, even if the engine 1 is automatically turned off, the vehicle does not displace backwards (backward displacement restriction force). If the vehicle displaces backwards, the driver additionally increases a brake pedal load by slightly depressing the brake pedal BP. Since the driver's foot is put on the brake pedal BP, the driver can easily depress the brake pedal additionally without any confusion. The automatic turning off operation of the engine 1 results in improved fuel economy and decreased amount of exhaust gas.

Conditions that the driving force turns in weak creep, the servo valve LSV is closed (shut-off condition), and that the engine 1 is automatically turned off are the same as those previously described with reference to FIG. 3.

The driver then releases the brake pedal BP in order to stand by restart of the vehicle. The control unit CU judges whether depression of the brake pedal BP is released (Brake Switch [OFF]) (S102 of FIG. 11). When the brake pedal BP is fully released (Brake Switch [OFF]), the automatic engine actuation order (F_ENGON) is transmitted. After a time lag derived from a delay of signal communication and mechanisms, the engine 1 is automatically actuated.

When the engine 1 is automatically actuated, driving force for starting the vehicle increases. The control unit CU judges whether the driving force reaches to a half of the driving force in the strong creep condition (S103 of FIG. 11). The braking force retaining unit RU remains in the shut-off condition unless the driving force increases to a half of the driving force in the strong creep condition.

Figure 11:
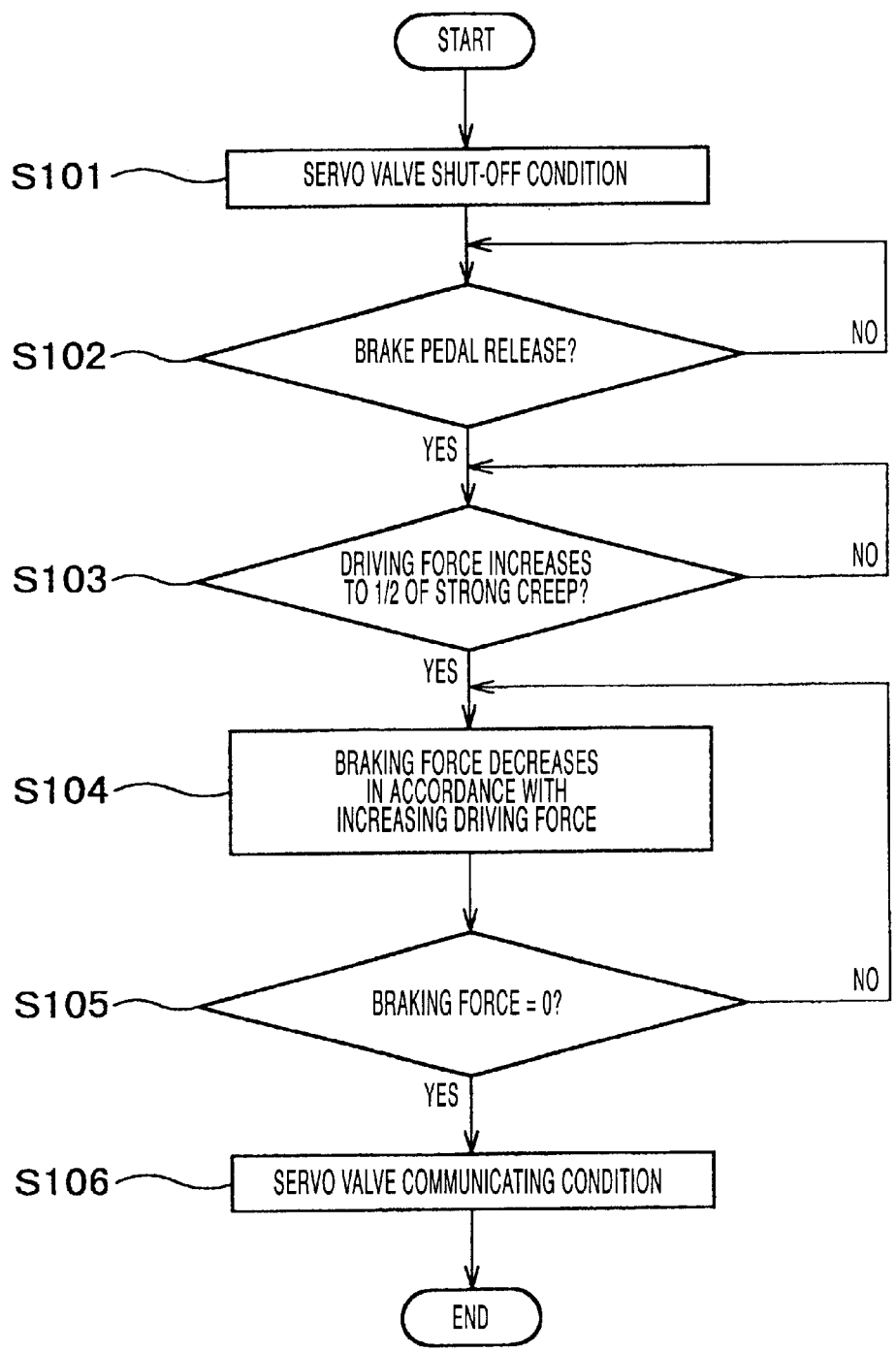
FIG. 11 shows a flow chart for the braking force reduction pattern 1 of the braking force retaining unit of FIG. 5 or 8.

When the driving force reaches to a half of the driving force in the strong creep condition, the braking force retaining unit RU decreases the braking force in accordance with the increasing driving force (S104 of FIG. 11). The control unit CU calculates the amount of electric currents to be supplied to the braking force retaining unit RU based on the driving force, hydraulic pressure at the wheel cylinder WC, resilient force of the spring S of the servo valve LSV and the like. The control unit CU supplies the servo valve LSV with the calculated amount of electric currents. According to the electric currents supplied, electromagnetic force is generated at the servo valve LSV such that ON-and-OFF condition of the valve is adjusted for reducing the brake fluid pressure within the wheel cylinder WC. The control unit CU calculates the amount of electric currents in such a way that the braking force decreases slightly at the beginning, and gradually and acceleratedly decreases for a while, and again slightly decreases at the end until the braking force falls to zero. Further, when calculating the amount of electric currents, the control unit CU calculates in such a way that the total amount of the increasing driving force and the decreasing braking force is sufficient for parking the vehicle on a slope having an inclination angle of 5 degrees. The vehicle is therefore prevented from unintentional backward displacement.

During the reduction of the braking force, the control unit CU judges whether the braking force is zero or not (S105 of FIG. 11), and it decreases the braking force until the braking force falls to zero.

When the driving force increases and turns in strong creep condition (F_SCRPON), driving force is exerted on the vehicle so as to stationarily retain the vehicle on the slope. The braking force is decreased by the braking force retaining unit RU, and the braking force falls to zero. The control unit CU ceases the current supply when the braking force falls to zero. The servo valve LSV is then open (communicating condition) (S106 of FIG. 11). The vehicle accelerates further by additionally depressing the accelerator pedal.

Conditions that the engine 1 is automatically turned on, and that the servo valve LSV is open are the same as those previously described with reference to FIG. 4.

As shown in FIG. 5, a phantom line is extending downwardly from the point "Brake Pedal Release" on the line indicating braking force. The phantom line indicates a case when the braking force is not retained. In this case, since the braking force is lost immediately after the brake pedal release, a smooth starting operation of the vehicle is not achieved.

<Time Chart for Control (2) with Automatic Engine Stop Operation>

With reference to FIG. 6, the way of control will be described for a vehicle having the above system configuration. The vehicle is operated in the order of braking, stopping and starting. When starting the vehicle, the servo valve LSV is controlled in the order of shut-off condition, flow restricting condition and communicating condition. Control of the servo valve LSV will be described with reference to the flow chart of FIG. 12. During the operation, the driving force reduction apparatus decreases the driving force to the weak creep condition and the driving motor stopping apparatus automatically turns off the engine 1. The positioning switch PSW and the mode switch MSW of the vehicle are not changed from D range/D mode.

The time chart of FIG. 6 shows a relation in time sequence between driving force and braking force of the vehicle, in which a thick line indicates driving force and a thin line indicates braking force.

Since the processes before stopping the vehicle are the same as those described in <Time Chart for Control (1) with Automatic Engine Stop Operation>, further explanation is omitted.

When the vehicle speed falls to 0 km/h, the servo valve LSV is closed (shut-off condition) (S201 of FIG. 12) and the engine 1 is automatically turned off (F_ENGOFF) so that the driving force is lost. Brake fluid pressure is retained within the wheel cylinder WC while the servo valve LSV is closed (shut-off condition). Meanwhile, since the engine 1 is turned off after the driving force turns in weak creep condition, the driver depresses the brake pedal BP in order to prevent unintentional backward displacement of the vehicle. Therefore, even if the engine 1 is automatically turned off, the vehicle does not displace backwards (backward displacement restriction force).

Conditions that the servo valve LSV turns in shut-off condition, and that the engine 1 is automatically turned off are the same as those previously described with reference FIG. 3.

The driver then releases the brake pedal BP in order to stand by restart of the vehicle. The control unit CU judges whether depression of the brake pedal BP is released (Brake Switch [OFF]) (S202 of FIG. 12). When the brake pedal BP is fully released (Brake Switch [OFF]), the automatic engine actuation order (F_ENGON) is transmitted. After a time lag derived from a delay of signal communication and mechanisms, the engine 1 is automatically actuated.

When the engine 1 is automatically actuated, driving force for starting the vehicle increases. The control unit CU judges whether the driving force reaches to a half of the driving force in the strong creep condition (S203 of FIG. 12). The braking force retaining unit RU remains in the shut-off condition unless the driving force increases to a half of the driving force in the strong creep condition.

Figure 12:
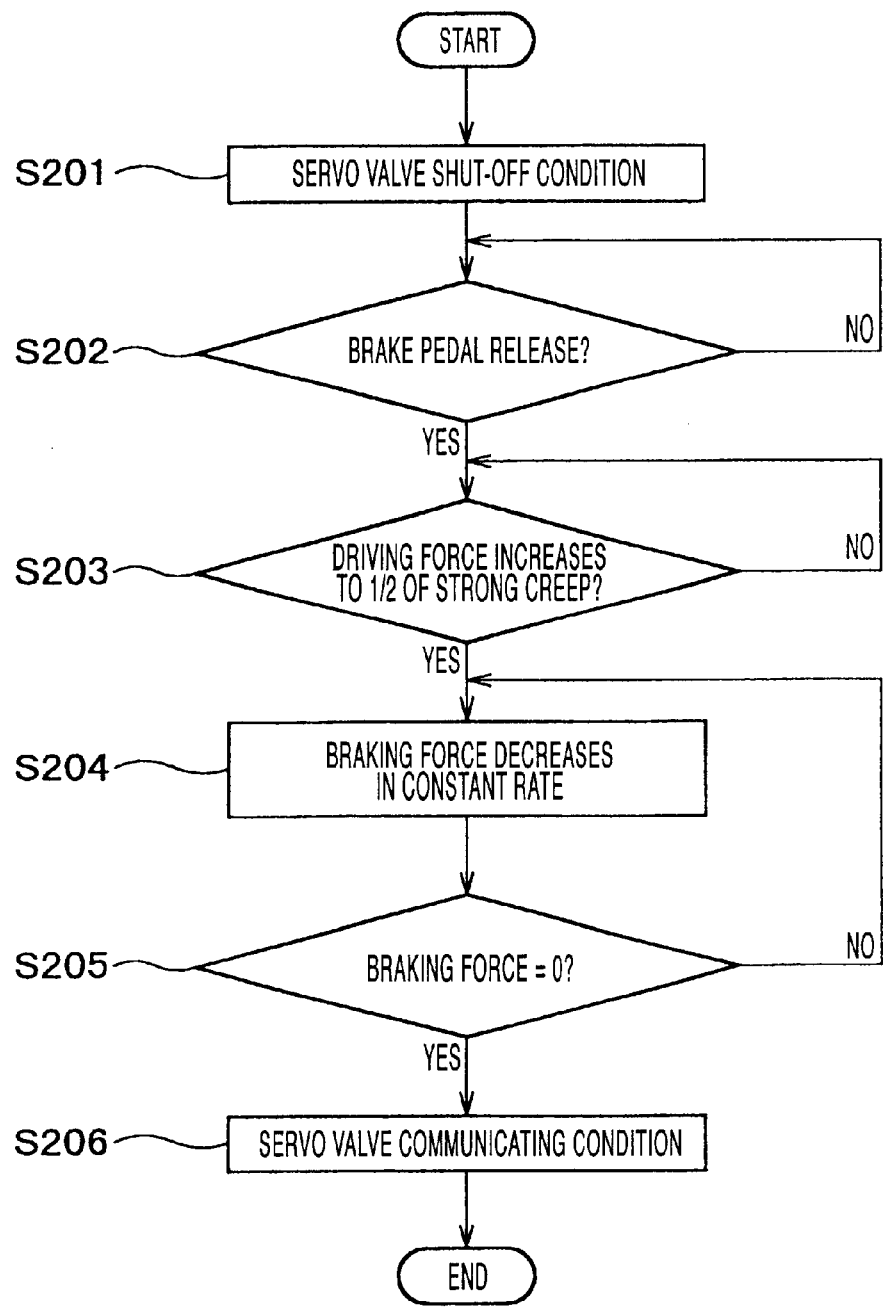
FIG. 12 shows a flow chart for the braking force reduction pattern 2 of the braking force retaining unit of FIG. 6 or 9.

When the driving force reaches to a half of the driving force in the strong creep condition, the braking force retaining unit RU decreases the braking force in a constant rate (S204 of FIG. 12). The control unit CU calculates the amount of electric currents to be supplied to the braking force retaining unit RU based on the driving force, hydraulic pressure at the wheel cylinder WC, resilient force of the spring S of the servo valve LSV and the like. The control unit CU supplies the servo valve LSV with the calculated amount of electric currents. According to the electric currents supplied, electromagnetic force is generated at the servo valve LSV such that ON-and-OFF condition of the valve is adjusted for reducing the brake fluid pressure within the wheel cylinder WC. As shown in FIG. 6, the control unit CU calculates the amount of electric currents in such a way that the braking force decreases in a constant rate. The condition for the constant decrement of the braking force is such that the total amount of the increasing driving force and the decreasing braking force is sufficient for parking the vehicle on a slope having an inclination angle of 5 degrees. The vehicle is therefore prevented from unintentional backward displacement. Further, the decreasing braking force shows a gentle line so that the driver does not experience a sudden impact due to instant release of the braking force.

During the reduction of the braking force, the control unit CU judges whether the braking force is zero or not (S205 of FIG. 12) and it decreases the braking force until the braking force falls to zero.

When the driving force increases and turns in strong creep condition (F_SCRPON), driving force is exerted on the vehicle so as to stationarily retain the vehicle on the slope. The braking force is decreased by the braking force retaining unit RU, and the braking force falls to zero. The control unit CU ceases the current supply when the braking force falls to zero. The servo valve LSV is then open (communicating condition) (S206 of FIG. 12). The vehicle accelerates further by additionally depressing the accelerator pedal.

Conditions that the engine 1 is automatically turned on, and that the servo valve LSV is open are the same as those previously described with reference to FIG. 4.

As shown in FIG. 6, a phantom line is extending downwardly from the point "Brake Pedal Release" on the line indicating braking force. The phantom line indicates a case when the braking force is not retained.

<Time Chart for Control (3) with Automatic Engine Stop Operation>

Figure 7:
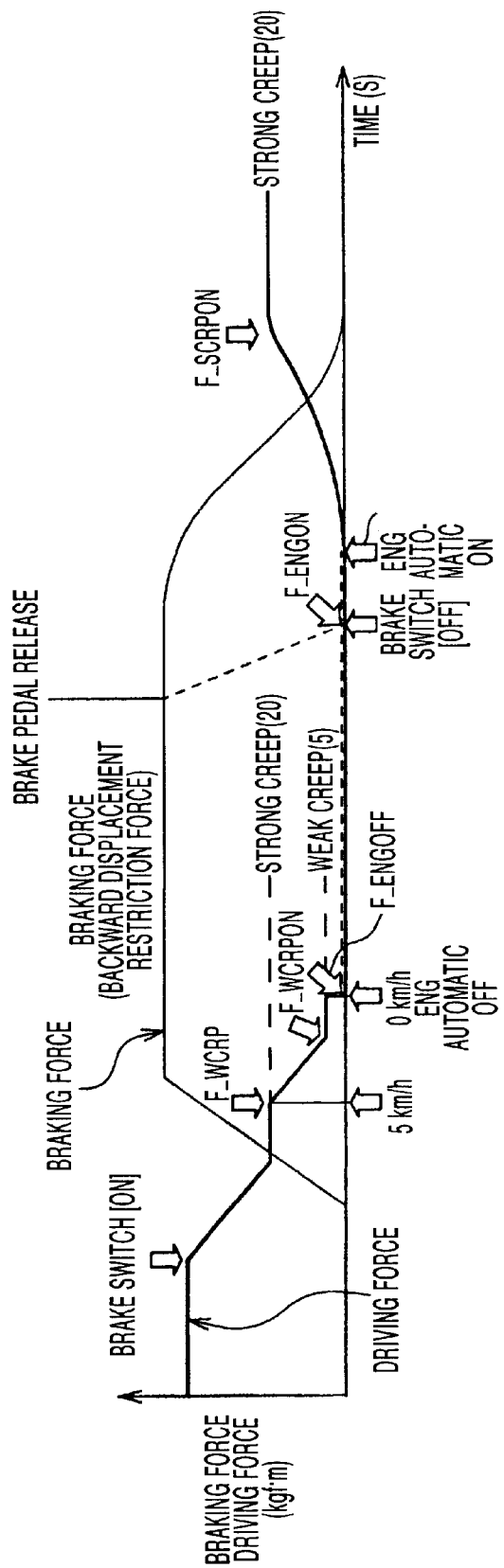
FIG. 7 is a time chart for the control (braking force reduction pattern 3) of a vehicle including a braking force retaining unit according to the present invention. Here, the engine of the vehicle is automatically turned off.

With reference to FIG. 7, the way of control will be described for a vehicle having the above system configuration. The vehicle is operated in the order of braking, stopping and starting. When starting the vehicle, the servo valve LSV is controlled in the order of shut-off condition, flow restricting condition and communicating condition. Control of the servo valve LSV will be described with reference to the flow chart of FIG. 13. During the operation, the driving force reduction apparatus decreases the driving force to the weak creep condition and the driving motor stopping apparatus automatically turns off the engine 1. The positioning switch PSW and the mode switch MSW of the vehicle are not changed from D range/D mode.

The time chart of FIG. 7 shows a relation in time sequence between driving force and braking force of the vehicle, in which a thick line indicates driving force and a thin line indicates braking force.

Since the processes before stopping the vehicle are the same as those described in <Time Chart for Control (1) with Automatic Engine Stop Operation>, further explanation is omitted.

When the vehicle speed falls to 0 km/h, the servo valve LSV is closed (shut-off condition) (S301 of FIG. 13) and the engine 1 is automatically turned off (F_ENGOFF) so that the driving force is lost. Brake fluid pressure is retained within the wheel cylinder WC while the servo valve LSV is closed (shut-off condition). Meanwhile, since the engine 1 is turned off after the driving force turns in weak creep condition, the driver depresses the brake pedal BP in order to prevent unintentional backward displacement of the vehicle. Therefore, even if the engine 1 is automatically turned off, the vehicle does not displace backwards (backward displacement restriction force).

Conditions that the servo valve LSV turns in shut-off condition, and that the engine 1 is automatically turned off are the same as those previously described with reference FIG. 3.

The driver then releases the brake pedal BP in order to stand by restart of the vehicle. The control unit CU judges whether depression of the brake pedal BP is released (Brake Switch [OFF]) (S302 of FIG. 13). When the brake pedal BP is fully released (Brake Switch [OFF]), the automatic engine actuation order (F_ENGON) is transmitted. After a time lag derived from a delay of signal communication and mechanisms, the engine 1 is automatically actuated.

When the engine 1 is automatically actuated, driving force for starting the vehicle increases. The control unit CU judges whether the increment of the driving force is initiated or not (S303 of FIG. 13). The braking force retaining unit RU remains in the shut-off condition unless the driving force increases.

Figure 13:
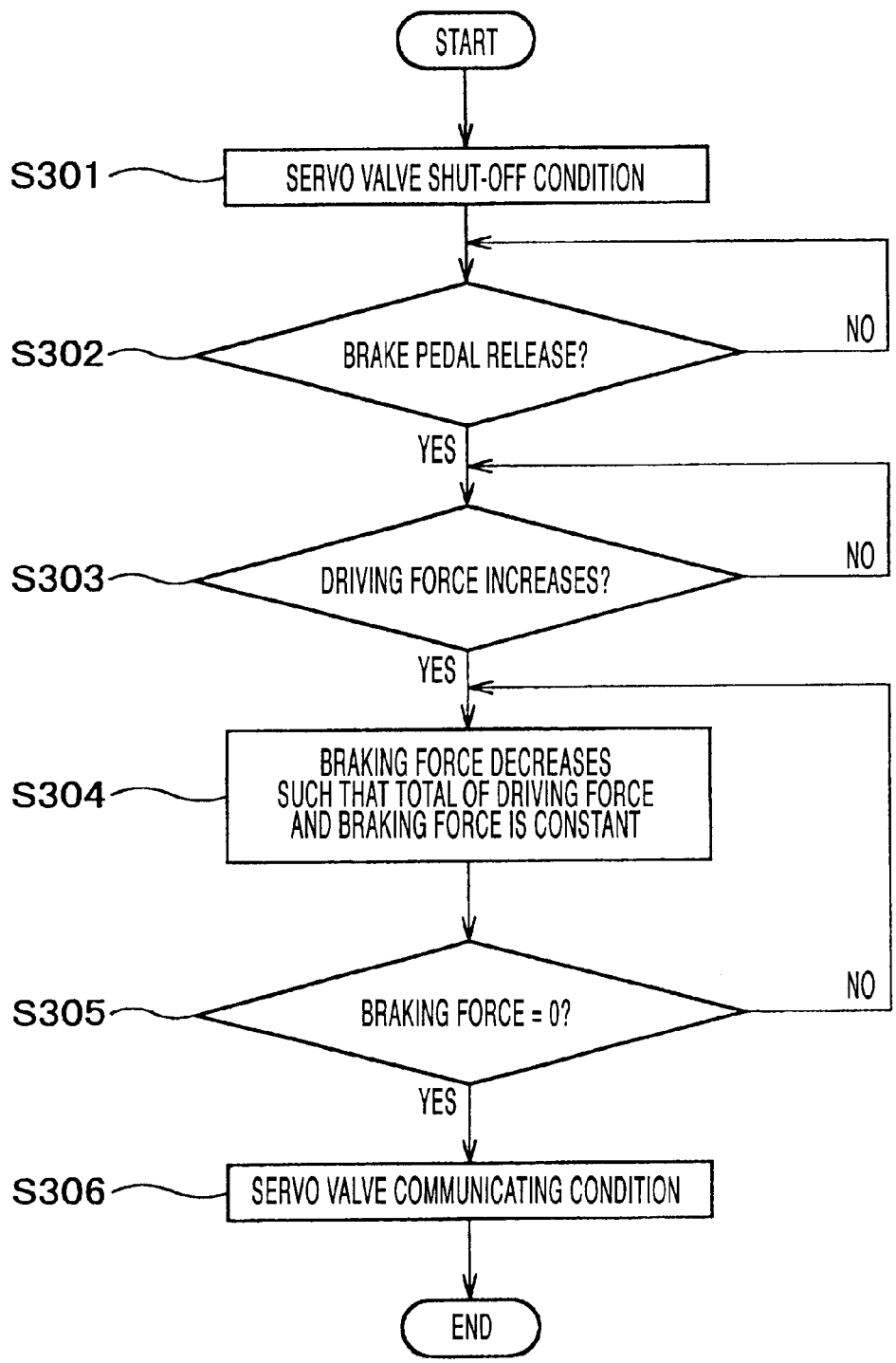
FIG. 13 shows a flow chart for the braking force reduction pattern 3 of the braking force retaining unit of FIG. 7 or 10.
Figure 14:
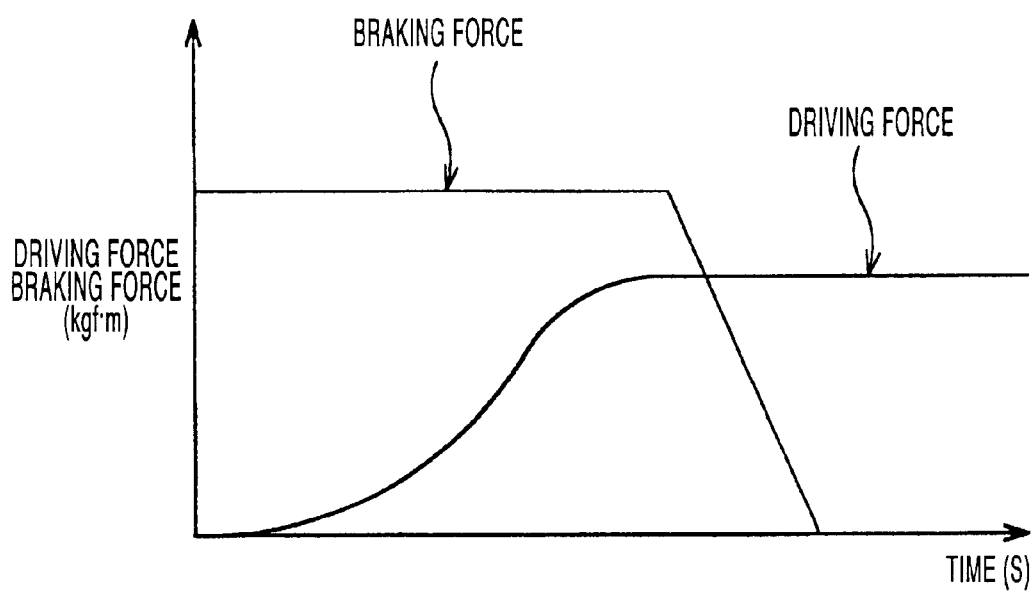
FIG. 14 shows a time chart for the control of a conventional braking force retaining unit while releasing braking force.

When the increment of the driving force is initiated, the braking force retaining unit RU decreases the braking force such that the total amount of the driving force and the braking force is constant (S304 of FIG. 13). The control unit CU calculates the amount of electric currents to be supplied to the braking force retaining unit RU based on the driving force, hydraulic pressure at the wheel cylinder WC, resilient force of the spring S of the servo valve LSV and the like. The control unit CU supplies the servo valve LSV with the calculated amount of electric currents. According to the electric currents supplied, electromagnetic force is generated at the servo valve LSV such that ON-and-OFF condition of the valve is adjusted for reducing the brake fluid pressure within the wheel cylinder WC. As shown in FIG. 7, the control unit CU calculates the amount of electric currents in such a way that the total amount of the driving force and the braking force is constant. Since the total amount of the driving force and the braking force is sufficient for parking the vehicle on a slope having an inclination angle of 5 degrees, the vehicle is prevented from unintentional backward displacement.

During the reduction of the braking force, the control unit CU judges whether the braking force is zero or not (S305 of FIG. 13) and it decreases the braking force until the braking force falls to zero. When the driving force turns in strong creep condition, the braking force is zero.

When the driving force increases and turns in strong creep condition (F_SCRPON), driving force is exerted on the vehicle so as to stationarily retain the vehicle on the slope. The braking force is decreased by the braking force retaining unit RU, and the braking force falls to zero. The control unit CU ceases the current supply when the braking force falls to zero. The servo valve LSV is then open (communicating condition) (S306 of FIG. 13). The vehicle accelerates further by additionally depressing the accelerator pedal.

Conditions that the engine 1 is automatically turned on, and that the servo valve LSV is open are the same as those previously described with reference to FIG. 4.

As shown in FIG. 7, a phantom line is extending downwardly from the point "Brake Pedal Release" on the line indicating braking force. The phantom line indicates a case when the braking force is not retained.

<Time Chart for Control (1) without Automatic Engine Stop Operation>

Figure 8:
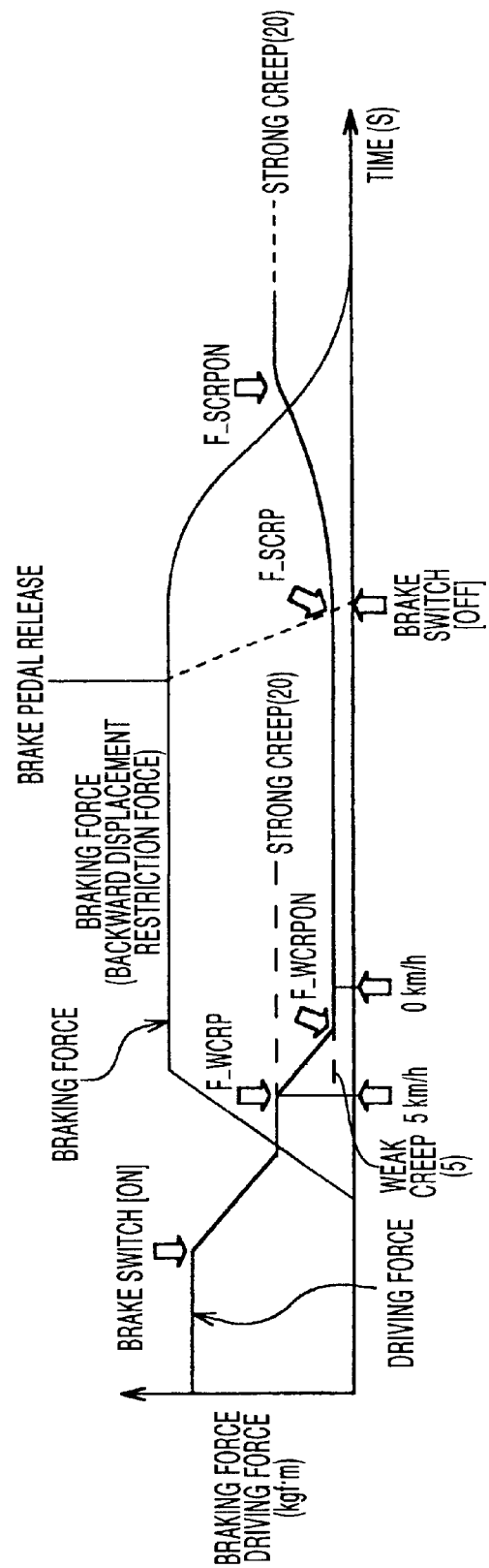
FIG. 8 is a time chart for the control (braking force reduction pattern 1) of a vehicle including a braking force retaining unit according to the present invention. Here, the engine of the vehicle is not automatically turned off.

With reference to FIG. 8, the way of control will be described for a vehicle having the above system configuration. The vehicle is operated in the order of braking, stopping and starting. When starting the vehicle, the servo valve LSV is controlled in the order of shut-off condition, flow restricting condition and communicating condition. Control of the servo valve LSV will be described with reference to the flow chart of FIG. 11. During the operation, the driving force reduction apparatus decreases the driving force to the weak creep condition. However, the engine 1 is not automatically turned off.

The engine 1 is not automatically turned off if the automatic engine stop condition is not satisfied or the vehicle is not provided with a driving motor stopping apparatus. The positioning switch PSW and the mode switch MSW of the vehicle are not changed from the D range/D mode.

The time chart of FIG. 8 shows a relation in time sequence between driving force and braking force of the vehicle, in which a thick line indicates driving force and a thin line indicates braking force.

As shown in FIG. 8, when the driver depresses the brake pedal BP while the vehicle is running (Brake Switch [ON]), braking force is increasing. Since the driver releases the accelerator pedal when he depresses the brake pedal BP, the driving force is gradually decreasing to the strong creep condition (normal idling). When the driver continuously depresses the brake pedal BP and the vehicle speed decreases below 5 km/h, the weak creep order (F_WCRP) is transmitted. The driving force further decreases and then turns in weak creep condition (F_WCRPON).

When the vehicle speed falls to 0 km/h, the servo valve LSV is closed (shut-off condition) (S101 of FIG. 11). Brake fluid pressure is retained within the wheel cylinder WC while the servo valve LSV is closed (shut-off condition). Meanwhile, since the vehicle is kept in weak creep condition, the driver depresses the brake pedal BP in order to prevent unintentional backward displacement of the vehicle. Therefore, even if the vehicle is kept in weak creep condition, the vehicle does not displace backwards (backward displacement restriction force). If the vehicle displaces backwards, the driver additionally increases a brake pedal load by slightly depressing the brake pedal BP. Since the driver is depressing the brake pedal BP (the driver's foot is placed on the brake pedal BP), the driver can easily depress the brake pedal additionally without any confusion.

Conditions that the driving force turns in weak creep, and that the servo valve LSV is closed (shut-off condition) are the same as those previously described with reference to FIG. 3.

The driver then releases the brake pedal BP in order to stand by restart of the vehicle. The control unit CU judges whether depression of the brake pedal BP is released (Brake Switch [OFF]) (S102 of FIG. 11). When the brake pedal BP is fully released (Brake Switch [OFF]), the strong creep order (F_SCRP) is transmitted and the driving force increases.

The control unit CU judges whether the driving force reaches to a half of the driving force in the strong creep condition (S103 of FIG. 11). The braking force retaining unit RU remains in the shut-off condition unless the driving force increases to a half of the driving force in the strong creep condition.

Since the control after the driving force reaches to a half of the driving force in the strong creep condition is the same as that described in <Time Chart for Control (1) with Automatic Engine Stop Operation>, further explanation is omitted.

Conditions that the driving force turns in strong creep are the same as those previously described with reference to FIG. 4.

As shown in FIG. 8, a phantom line is extending downwardly from the point "Brake Pedal Release" on the line indicating braking force. The phantom line indicates a case when the braking force is not retained.

<Time Chart for Control (2) without Automatic Engine Stop Operation>

Figure 9:
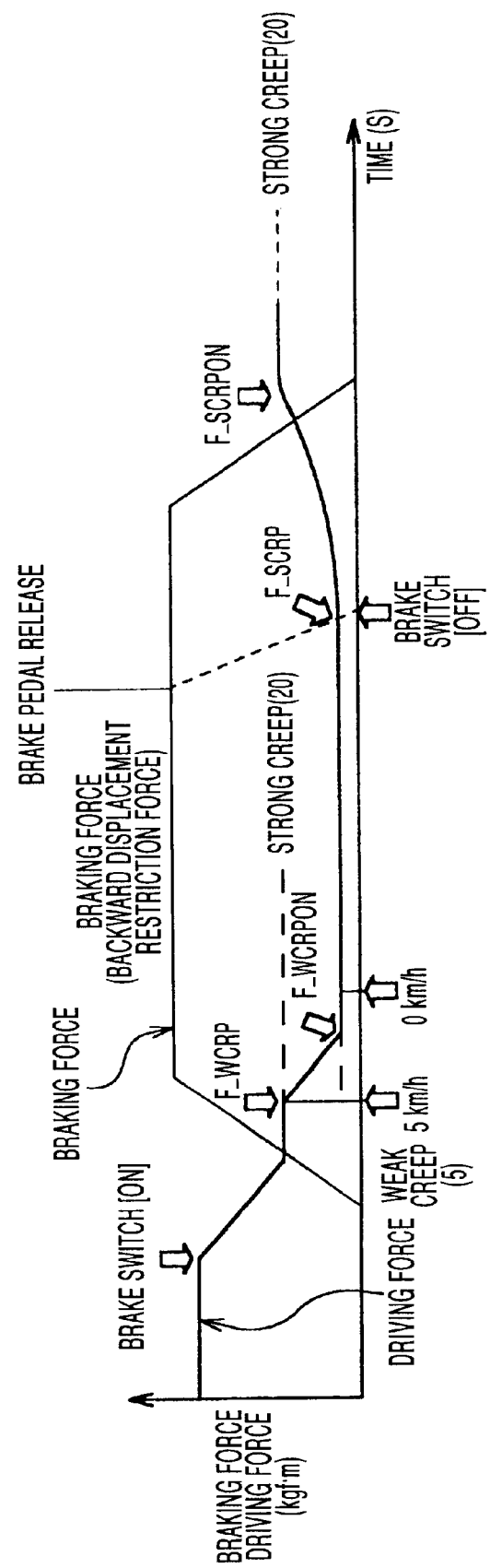
FIG. 9 is a time chart for the control (braking force reduction pattern 2) of a vehicle including a braking force retaining unit according to the present invention. Here, the engine of the vehicle is not automatically turned off.

With reference to FIG. 9, the way of control will be described for a vehicle having the above system configuration. The vehicle is operated in the order of braking, stopping and starting. When starting the vehicle, the servo valve LSV is controlled in the order of shut-off condition, flow restricting condition and communicating condition. Control of the servo valve LSV will be described with reference to the flow chart of FIG. 12. During the operation, the driving force reduction apparatus decreases the driving force to the weak creep condition. However, the engine 1 is not automatically turned off.

The engine 1 is not automatically turned off if the automatic engine stop condition is not satisfied or the vehicle is not provided with a driving motor stopping apparatus. The positioning switch PSW and the mode switch MSW of the vehicle are not changed from the D range/D mode.

The time chart of FIG. 9 shows a relation in time sequence between driving force and braking force of the vehicle, in which a thick line indicates driving force and a thin line indicates braking force.

Since the control before the driving force turns in weak creep condition and the braking force is retained is the same as that described in <Time Chart for Control (1) without Automatic Engine Stop Operation>, further explanation is omitted.

The driver releases the brake pedal BP in order to stand by restart of the vehicle. The control unit CU judges whether depression of the brake pedal BP is released (Brake Switch [OFF]) (S202 of FIG. 12). When the brake pedal BP is fully released (Brake Switch [OFF]), the strong creep order (F_SCRP) is transmittedand the driving force increases.

The control unit CU judges whether the driving force reaches to a half of the driving force in the strong creep condition (S203 of FIG. 12). The braking force retaining unit RU remains in the shut-off condition unless the driving force increases to a half of the driving force in the strong creep condition.

Since the control after the driving force reaches to a half of the driving force in the strong creep condition is the same as that described in <Time Chart for Control (2) with Automatic Engine Stop Operation>, further explanation is omitted.

Conditions that the driving force turns in strong creep are the same as those previously described with reference to FIG. 4.

As shown in FIG. 9, a phantom line is extending downwardly from the point "Brake Pedal Release" on the line indicating braking force. The phantom line indicates a case when the braking force is not retained.

<Time Chart for Control (3) without Automatic Engine Stop Operation>

Figure 10:
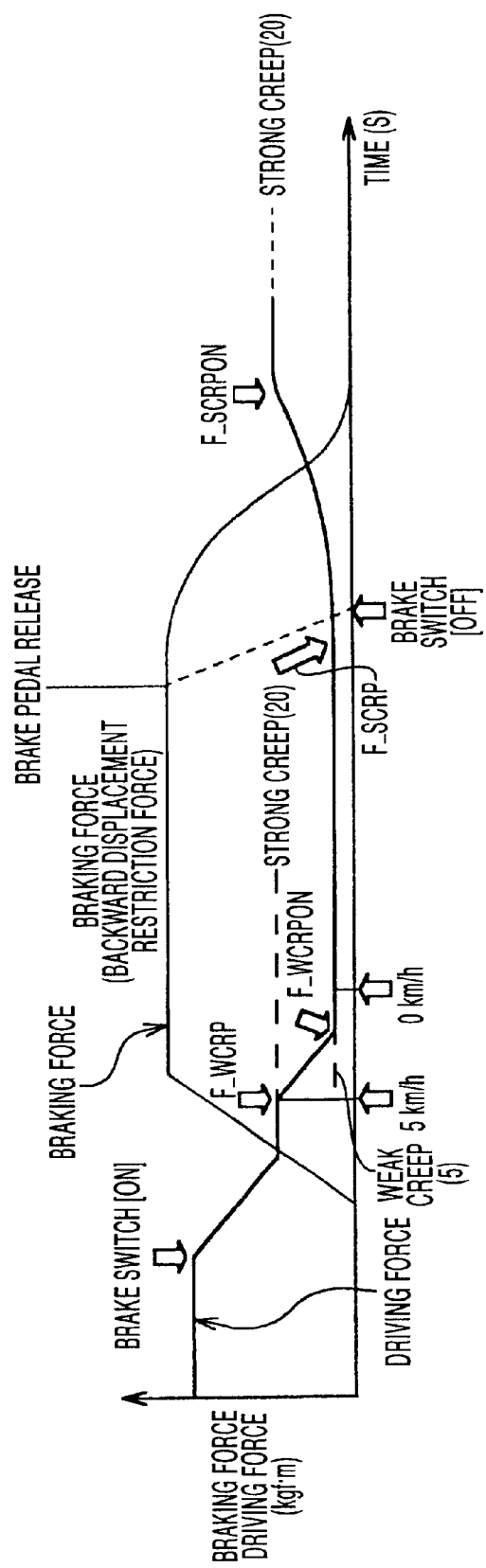
FIG. 10 is a time chart for the control (braking force reduction pattern 3) of a vehicle including a braking force retaining unit according to the present invention. Here, the engine of the vehicle is not automatically turned off.

With reference to FIG. 10, the way of control will be described for a vehicle having the above system configuration. The vehicle is operated in the order of braking, stopping and starting. When starting the vehicle, the servo valve LSV is controlled in the order of shut-off condition, flow restricting condition and communicating condition. Control of the servo valve LSV will be described with reference to the flow chart of FIG. 13. During the operation, the driving force reduction apparatus decreases the driving force to the weak creep condition. However, the engine 1 is not automatically turned off.

The engine 1 is not automatically turned off if the automatic engine stop condition is not satisfied or the vehicle is not provided with a driving motor stopping apparatus. The positioning switch PSW and the mode switch MSW of the vehicle are not changed from the D range/D mode.

The time chart of FIG. 10 shows a relation in time sequence between driving force and braking force of the vehicle, in which a thick line indicates driving force and a thin line indicates braking force.

Since the control before the driving force turns in weak creep condition and the braking force is retained is the same as that described in <Time Chart for Control (1) without Automatic Engine Stop Operation>, further explanation is omitted.

The driver releases the brake pedal BP in order to stand by restart of the vehicle. The control unit CU judges whether depression of the brake pedal BP is released (Brake Switch [OFF]) (S302 of FIG. 13). When the brake pedal BP is fully released (Brake Switch [OFF]), the strong creep order (F_SCRP) is transmitted and the driving force increases.

The control unit CU judges whether the increment of the driving force is initiated or not (S303 of FIG. 13). The braking force retaining unit RU remains in the shut-off condition unless the driving force increases.

Since the control after the increment of the driving force is initiated is the same as that described in <Time Chart for Control (3) with Automatic Engine Stop Operation>, further explanation is omitted.

Conditions that the driving force turns in strong creep are the same as those previously described with reference to FIG. 4.

As shown in FIG. 10, a phantom line is extending downwardly from the point "Brake Pedal Release" on the line indicating braking force. The phantom line indicates a case when the braking force is not retained.

According to the braking force retaining unit, since the braking force is gradually decreased and is not instantly released, the driver does not experience a sudden impact upon starting the vehicle. Further, brake dragging does not occur since unnecessary braking force is decreased with regard to the increasing driving force upon starting the vehicle. Until the driving force reaches to a certain value backward displacement restriction force, i.e., the total amount of the driving force and the braking force is retained to the braking force before initiating the reduction of the braking force or more. This is for reducing the braking force in accordance with the increasing driving force. Therefore, the vehicle does not displace backwards on the slope even if the reduction of the braking force is initiated before the driving force reaches to a certain value.

While the present invention has been described by way of specific examples, it is to be understood that changes and variations may be made without departing from the spirit or scope of the following claims.

For example, the braking force retaining unit may be constructed as means for acting on the brake fluid pressure within the wheel cylinder that is the braking force. However, the braking force retaining unit is not restricted to such means as long as it can act on the braking force.

Further, a servo valve is employed in the preferred embodiments as means for shut-off, communicate or restrict a flow of brake fluid. However, other means may be employed if it can shut-off, communicate or restrict a flow of brake fluid.

What is claimed is:

1. A braking force retaining unit, which retains braking force until a driving force for starting a vehicle increases to a certain value such that the braking force continues to act on the vehicle after releasing a brake pedal, wherein the braking force retaining unit decreases the braking force in accordance with an increasing creep driving force; and wherein the driving force is determined by measuring a torque transmission capacity of a clutch engagement of the vehicle.

2. A braking force retaining unit, which retains braking force until a driving force for starting a vehicle increases to a certain value such that the braking force continues to act on the vehicle after releasing a brake pedal, wherein the braking force retaining unit decreases the braking force in accordance with an increasing creep driving force; and wherein the braking force retaining unit gradually decreases the braking force at a rate such that a sum of the driving force and the braking force is substantially constant.

3. A vehicle comprising a braking force retaining unit, wherein the braking force retaining unit retains braking force until a driving force for starting the vehicle increases to a certain value such that the braking force continues to act on the vehicle after releasing a brake pedal of the vehicle, and wherein the braking force retaining unit decreases the braking force in accordance with an increasing creep driving force; and wherein the driving force is determined by measuring a torque transmission capacity of a clutch engagement of the vehicle.

4. A vehicle comprising a braking force retaining unit, wherein the braking force retaining unit retains braking force until a driving force for starting the vehicle increases to a certain value such that the braking force continues to act on the vehicle after releasing a brake pedal of the vehicle, and wherein the braking force retaining unit decreases the braking force in accordance with an increasing creep driving force; and wherein the braking force retaining unit gradually decreases the braking force at a rate such that a sum of the driving force and the braking force is substantially constant.

5. A vehicle comprising a braking force retaining unit, wherein the braking force retaining unit retains braking force until a driving force for starting the vehicle increases to a certain value such that the braking force continues to act on the vehicle after releasing a brake pedal of the vehicle, and wherein the braking force retaining unit decreases the braking force in accordance with an increasing creep driving force;

wherein the braking force retaining unit comprises an adjustable servo valve that adjusts a flow of brake fluid for gradually decreasing the braking force;

wherein the braking force retaining unit further comprises a control unit that controls an electrical signal to the adjustable servo valve such that the flow of brake fluid through the servo valve is continuously adjusted in accordance with the electrical signal; and wherein the control unit includes a fail-safe mode that controls the braking force retaining unit to release the braking force after a predetermined period of time after the release of the brake pedal.

6. A vehicle comprising a braking force retaining unit, wherein the braking force retaining unit retains braking force until a driving force for starting the vehicle increases to a certain value such that the braking force continues to act on the vehicle after releasing a brake pedal of the vehicle, and wherein the braking force retaining unit decreases the braking force in accordance with an increasing creep driving force; and wherein the vehicle operates in weak creep mode during which a weak creep driving force is applied to the vehicle, and strong creep mode during which a strong creep driving force, which is greater than the weak creep driving force, is applied to the vehicle, and wherein the braking force retaining unit gradually decreases the braking force in accordance with the increasing driving force once the driving force reaches a predetermined fraction of the strong creep driving force.

* * * * *